US008264323B2

(12) United States Patent
Chandler, Jr.

(10) Patent No.: US 8,264,323 B2

(45) Date of Patent: Sep. 11, 2012

(54) METHOD AND APPARATUS FOR A MERGED POWER-COMMUNICATION CABLE IN DOOR SECURITY ENVIRONMENT

(76) Inventor: Edmonds H. Chandler, Jr., Lafayette, CA (US)

( * ) Notice: Subject to any disclaimer, the term of this patent is extended or adjusted under 35 U.S.C. 154(b) by 1207 days.

(21) Appl. No.: 11/883,689

(22) PCT Filed: Feb. 6, 2006

(86) PCT No.: PCT/US2006/004263

§ 371 (c)(1), (2), (4) Date: Aug. 3, 2007

(87) PCT Pub. No.: WO2006/084271

PCT Pub. Date: Aug. 10, 2006

(65) Prior Publication Data

US 2008/0209228 A1 Aug. 28, 2008

(51) Int. Cl.

*B60R 25/00* (2006.01)
*G05B 19/00* (2006.01)
*G06F 7/00* (2006.01)
*H04B 1/00* (2006.01)

(52) U.S. Cl. ........................... 340/5.7; 340/538; 70/277

(58) Field of Classification Search .................. 340/5.7, 340/538; 70/277, 278.1, 279.1; 709/224; 713/186; 292/346; 235/380, 382

See application file for complete search history.

(56) References Cited

U.S. PATENT DOCUMENTS 5,867,107 A * 2/1999 Gartner ........................ 340/5.31
5,936,544 A * 8/1999 Gonzales et al. ............ 340/5.22
6,259,352 B1 * 7/2001 Yulkowski et al. ............ 340/5.7
6,784,784 B1 * 8/2004 Zehrung ........................ 340/5.3
6,792,323 B2 9/2004 Krzyzanowski et al.
7,046,983 B2 * 5/2006 Elkayam et al. .............. 455/402
7,091,857 B2 * 8/2006 Lanigan et al. ............ 340/545.6
7,113,103 B2 * 9/2006 Festa et al. .................... 340/652
7,548,151 B2 * 6/2009 Roosli et al. .................. 340/5.6

* cited by examiner

*Primary Examiner* — Nam V Nguyen

(74) *Attorney, Agent, or Firm* — GSS Law Group

(57) ABSTRACT

A method controlling access to a door using a merged power-communication cable. An access controlled door lock in door is operated using merged power-communication cable. Access control identification mechanism in door may operate using merged power-communication cable. The access controlled door lock may include a piezoelectric controlled door lock or a standalone door lock or a solenoid controlled door lock. A processing module may operate in door to control access with power interface receiving at least part of the electrical power from the merged power-communication cable. The invention includes a strike plate containing a magnetic sensor aligns by a latch hole to a latch included an access control door lock. The invention also includes using a door conduit to provide the merged power-communication cable to at least the processing module in the door.

38 Claims, 18 Drawing Sheets

METHOD AND APPARATUS FOR A MERGED POWER-COMMUNICATION CABLE IN DOOR SECURITY ENVIRONMENT

TECHNICAL FIELD

The invention relates to an access controlled door lock in a door, as well as a conduit providing the merged power-communications cable for interactions and power delivery for components within the door.

BACKGROUND OF THE INVENTION

The invention relates to improving security and access control for doors using a merged power-communication cable, which allows the entire access control identification mechanism to reside within the door.

Today, an access control system for a door requires at least an access control identification mechanism, an access controlled door lock, a way to generate a Request-to-Exit (REX) signal, and a door position sensor. These elements are used to form the prior art access control system involving a power network and a data-communications network. An equipment closet is usually physically located near the door being controlled. The equipment closet contains a door lock power supply and a data-communications node. The power network couples to the door lock power supply. The data-communications network couples to the data-communications node. The data-communications node communicates with a central security node, often through a communications network.

There are several problems with the access control door systems of the prior art. Installing an access controlled door lock system involves a lot of wiring, entailing high installation expenses. The power network and the data-communications networks require many different cables wired to each door being controlled. Once the wiring has been installed, each interface from the equipment closet to the door must be tested. Such testing costs personnel time and may cause delays in deploying an access control system in multiple door environments, such as industrial, commercial and government buildings. Additionally, maintenance and repair is complicated by the wiring complexity. These complications cost the user money.

Some common terms used to describe communications follow, based upon on the web site glossary of technical terms from the web site http://www.its.bldrdoc.gov/fs-1037/dir-001/_0063.htm, accessed in 2004.

The Open Systems Interconnection-Reference Model (OSI-RM) refers to an abstract description of the digital communications between application processes running in distinct systems. The model employs a hierarchical structure of seven layers. Each layer performs value-added service at the request of the adjacent higher layer and, in turn, requests more basic services from the adjacent lower layer:

The Physical Layer is Layer 1, the lowest of seven hierarchical layers of the OSI-RM. The Physical layer performs services requested by the Data Link Layer. There are three major functions and services performed by the physical layer. First, establishment and termination of a connection to a communications medium. Second, participation in the process whereby the communication resources are effectively shared among multiple users, e.g., contention resolution and flow control. And third, conversion between the representation of digital data in user equipment and the corresponding signals transmitted over a communications channel.

The Data Link Layer is Layer 2 of the OSI-RM. This layer responds to service requests from the Network Layer and issues service requests to the Physical Layer. The Data Link Layer provides the functional and procedural means to transfer data between network entities and to detect and possibly correct errors that may occur in the Physical Layer. Note: Examples of data link protocols are HDLC and ADCCP for point-to-point or packet-switched networks and LLC for local area networks.

The Network Layer is Layer 3 of the OSI-RM. This layer responds to service requests from the Transport Layer and issues service requests to the Data Link Layer. The Network Layer provides the functional and procedural means of transferring variable length data sequences from a source to a destination via one or more networks while maintaining the quality of service requested by the Transport Layer. The Network Layer performs network routing, flow control, segmentation/desegmentation, and error control functions.

The Transport Layer is Layer 4 of the OSI-RM. This layer responds to service requests from the Session Layer and issues service requests to the Network Layer. The purpose of the Transport Layer is to provide transparent transfer of data between end users, thus relieving the upper layers from any concern with providing reliable and cost-effective data transfer.

The Session Layer is Layer 5 of the OSI-RM. This layer responds to service requests from the Presentation Layer and issues service requests to the Transport Layer. The Session Layer provides the mechanism for managing the dialogue between end-user application processes. It provides for either duplex or half-duplex operation and establishes checkpointing, adjournment, termination, and restart procedures.

The Presentation Layer is Layer 6 of the OSI-RM. This layer responds to service requests from the Application Layer and issues service requests to the Session Layer. The Presentation Layer relieves the Application Layer of concern regarding syntactical differences in data representation within the end-user systems. Note: An example of a presentation service would be the conversion of an EBCDIC-coded text file to an ASCII-coded file.

The Application Layer is Layer 7, the highest layer of the OSI-RM. This layer interfaces directly to and performs common application services for the application processes; it also issues requests to the Presentation Layer. The common application services provide semantic conversion between associated application processes. Note: Examples of common application services of general interest include the virtual file, virtual terminal, and job transfer and manipulation protocols.

Communications refers herein to at least one of the following First, information transfer, among users or processes, according to agreed conventions. Second, the branch of technology concerned with the representation, transfer, interpretation, and processing of data among persons, places, and machines. The meaning assigned to the data typically must be preserved during these operations.

Information transfer refers herein to the process of moving messages containing user information from a source to a sink.

Data refers here to representations of facts, concepts, or instructions in a formalized manner suitable for communication, interpretation, or processing by humans or by automatic means. Any representations such as characters or analog quantities to which meaning is or might be assigned.

A Layer in a telecommunications network and/or an open systems architecture, refers herein to a group of related functions that are performed in a given level in a hierarchy of groups of related functions. In specifying the functions for a given layer, the assumption is made that the specified functions for the layers below are performed, except for the lowest layer.

Open systems architecture refers herein to a layered hierarchical structure, configuration, or model of a communications or distributed data processing system and/or a nonproprietary systems architecture.

The layered hierarchical structure, configuration, or model of a communications or distributed data processing system provides the following: the layered hierarchical structure enables system description, design, development, installation, operation, improvement, and maintenance to be performed at a given layer or layers in the hierarchical structure. The layered hierarchical structure allows each layer to provide a set of accessible functions that can be controlled and used by the functions in the layer above it. The layered hierarchical structure enables each layer to be implemented without affecting the implementation of other layers. The layered hierarchical structure allows the alteration of system performance by the modification of one or more layers without altering the existing equipment, procedures, and protocols at the remaining layers.

Examples of independent alterations by modifying one or more layers include the following. Converting from wire to optical fibers at a physical layer without affecting the data-link layer or the network layer except to provide more traffic capacity. And altering the operational protocols at the network level without altering the physical layer.

Connection refers here to at least one of the following: A provision for a signal to propagate from one point to another, such as from one circuit, line, subassembly, or component to another. An association established between functional units for conveying information.

Communications medium refers herein to at least one of the following: In telecommunications, the transmission path along which a signal propagates, such as a wire pair, coaxial cable, waveguide, optical fiber, or radio path. The material on which data are or may be recorded, such as plain paper, paper tapes, punched cards, magnetic tapes, magnetic disks, or optical disks.

A channel refers herein to at least one of the following: A connection between initiating and terminating nodes of a circuit. A single path provided by a transmission medium via either physical separation, such as by multipair cable or electrical separation, such as by frequency- or time-division multiplexing. A path for conveying electrical or electromagnetic signals, usually distinguished from other parallel paths. Used in conjunction with a predetermined letter, number, or codeword to reference a specific radio frequency. The portion of a storage medium, such as a track or a band, that is accessible to a given reading or writing station or head. In a communications system, the part that connects a data source to a data sink.

A transfer refers herein to sending information from one location and to receive it at another.

A packet refers herein to a sequence of binary digits, which may including data and/or control signals, that is transmitted and/or switched as a composite whole. The data, control signals, and possibly error control information, are typically arranged in a specific format.

A format refers herein to the arrangement of bits or characters within a group, such as a word, message, or language.

A group refers herein to the following within the context of frequency division multiplexing and/or in the context of a set of characters forming a unit for transmission of cryptographic treatment. A group in frequency-division multiplexing refers herein to a specific number of associated voice channels and/or data channels, either within a supergroup or as an independent entity.

Routing refers herein to the process of determining and prescribing the path or method to be used for establishing telephone connections or forwarding messages.

TCP/IP refers herein to Transmission Control Protocol/Internet Protocol, which is a set of communications protocols required to communicate over a channel with the Internet. A TCP/IP Stack refers herein to the method of interacting with the Internet, which is often implemented as software running on a computer. The Internet Protocol refers herein to a packet switching protocol used as the network layer in the TCP/IP stack.

To summarize. Methods and apparatus are needed which simplify installation of access control systems for doors. A simple, modular approach is needed for installing and operating an access control system for a door. Access control systems are needed which can be installed in a door with a minimum of wiring. Access control systems are needed which interact across standard communications networks with centralized security systems.

SUMMARY OF THE INVENTION

The invention includes a preferred mechanism for controlling access through a door, which electrically couples to security and power networks through a merged power-communication cable. This is the invention's access control module. When installed, the access control module preferably couples with a position magnet located in a strike plate mounted in the door frame. The access control module preferably includes an access control identification mechanism, an access controlled door lock, a door position sensor, and a Request Exit switch. Today the access control identification mechanism is preferably an access control scanning device, which is further preferably an access control card reader. The invention includes many alternatives on the elements of the access control module, which will be disclosed in the detailed description to follow.

The invention has the advantages of providing network interacting door locks without any additional power wiring. It supports security software models such as door objects as discussed on the www.sbd.us web site. It allows door security control to easily employ one or more communication networks to update access to each door equipped with the invention.

The invention includes a method of controlling access to the door using a merged power-communication cable. Electrical power is provided from the merged power-communication cable through a means for managing the electrical power to a processing module, an access control identification mechanism and an access controlled door lock. The processing module interacts with the access control identification mechanism and with the merged power-communication cable to control the access controlled door lock. The processing module and the access controlled door lock are located in the door. Preferably, the access control identification mechanism is also located in the door.

The invention also includes a method of using the access control module to make an access controlled door. By way of example, an installation estimate based upon this method shows an access door total of less than half the estimated cost of the prior art approach.

DETAILED DESCRIPTION

Figure 1A:
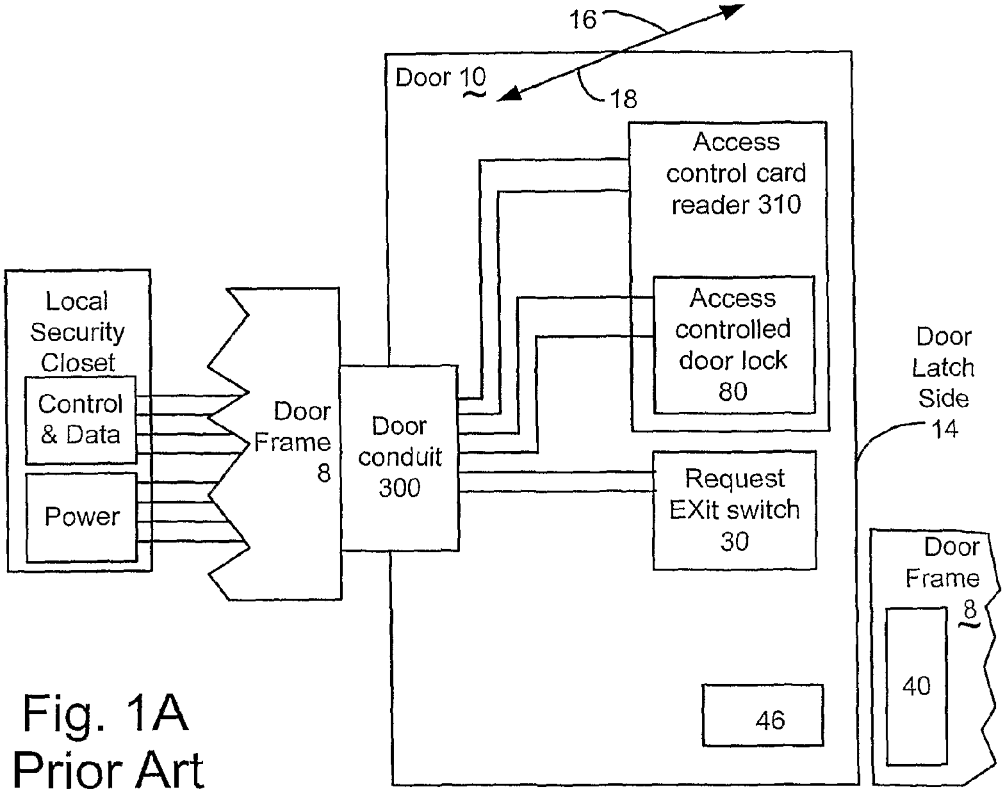
Fig. 1A Prior Art
FIG. 1A shows a simplified schematic of a typical prior art access controlled door.
Figure 1B:
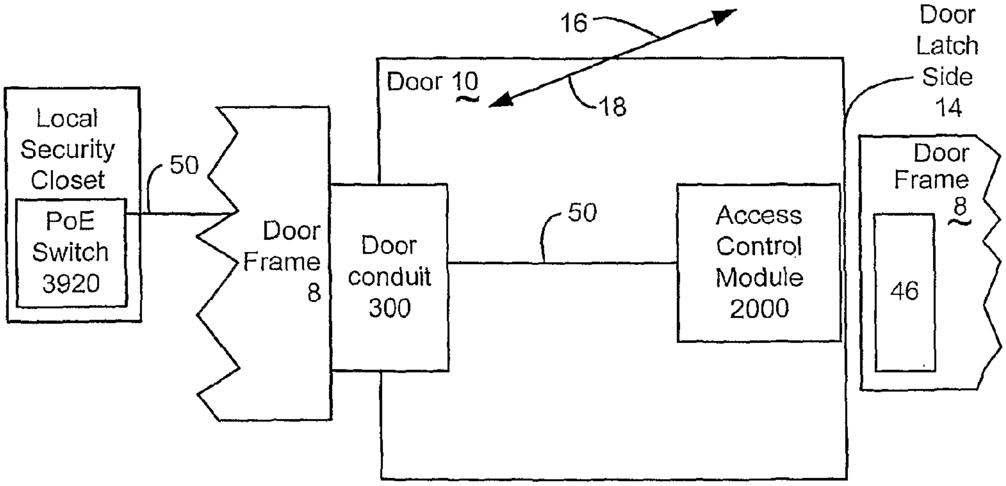
FIG. 1B shows a schematic of the inventions access control module coupling a merged power-communication cable through a door conduit and aligned with a position magnet mounted in a door frame on the door latch side.

The invention includes a method of using an access control module 2000 to make an access controlled door as shown in FIG. 1B. By way of example, an installation estimate based upon this method shows an access door total of less than half the estimated cost of the prior art approach shown in FIG. 1A.

The inventor has recognized a need for improvement, and provided a solution to a significant installation cost problem.

FIG. 1A shows a schematic of a door 10 implementing the access control technology of the prior art. The access control technology of today requires separate installation of an access control card reader 310, a Request Exit Switch 30, a door position sensor 40 and an access controlled door lock 80. Each of these units requires separate wiring through at least one door conduit 300, which must provide power and communications wiring to each of these modules. The door frame 8 must further include a position magnet 46, which must work successfully with the door position sensor 40. During installation the position magnet 46 must be aligned with the door position sensor 40. Often these units must be installed in the door and tested one at a time, which dramatically increases the installation time and cost. The cost of running the many separate wires dramatically adds to the installation time and cost. At the local security closet, each of the control and data connections, as well as the power connections, for each of the installed units, must also be built and tested.

FIG. 1B shows a schematic of the door 10 using a preferred access control module 2000, which in turn uses a merged power-communication cable 50. The merged power-communication cable 50 is provided through the door conduit 300 to a security network 5002, as will be discussed in FIG. 16B. The access control module will be discussed further in FIGS. 2, 3A, 4A, 4B, SA, 6A, 6B, and 9.

The invention has the advantage of providing network interacting door locks without any addition power wiring. It supports security software models such as door objects. It allows door security control to easily employ one or more communication networks to update access to each door equipped with the invention.

Tables 1 and 2 show installation estimates for the prior art door of FIG. 1A and the invention's door of FIG. 1B.

| Item | Remark | Cost |
|---|---|---|
| Electric lock premium over mechanical lock | Assume a mortise lock | $400 |
| Wired hinge premium over a mechanical hinge | Assume a wired hinge | $100 |
| Door board for connections at the door | Typical of many systems | $500 |
| Portion of access panel or Smart Remote Box Cost of Smart Remote Box with 16 portions for a fully utilized panel including 40 hours installation at $75 per hour | Assume 16 card reader capacity with 12 Volt and 24 Volt DC power supplies | $750 |
| Access control card reader | Typical prior art switch plate style | $400 |
| Door contact | In edge of door as in FIGS. 1B or 1E | $10 |
| Request-to-Exit Switch | PIR Device | $150 |
| Install equipment at door | 6 hours at $75 per hour | $450 |
| Wire cost from Smart Remote Box to door and wire at door | 150 feet at $0.50 per foot | $75 |
| Wire installation cost to door | 160 feet, 4 hours at $75 per hour | $300 |
| Junction box for door, back box for card reader, plus any conduit stubs to ceiling | | $500 |
| Programming | 1 hour at $75 per hour | $75 |
| Sub total | | $3710 |
| Warranty, overhead and profit at 15% | | $557 |
| Access door total | | $4,267 |

Table 1 illustrates an installation estimate for the access controlled door of FIG. 1A using the prior art, indicating a total cost of over $4,200 (US).

| Item | Remark | Cost |
|---|---|---|
| Access control module premium over a mechanical lock. This assumes a mortise lock at $400, so the access control module at $1,300 | Assume a mortise lock | $900 |
| Wired hinge premium over a mechanical hinge | Assume a wired hinge | $100 |
| Portion of access panel or Smart Remote Box with 1 Rack Unit in an IDF closet with 16 portions for a fully utilized panel including 2 hours installation at $75 per hour | Assume 16 access control card reader capacity with panel cost at $1,600 | $100 |
| Off-the-shelf PoE IP switch | 24 port at $1,000, but only 17 used | $65 |
| Install equipment at door | 1 hours at $75 per hour | $75 |
| Wire cost from Smart Remote Box to door and wire at door | 150 feet at $0.10 per foot | $15 |
| Wire installation cost to door | 160 feet, 2 hours at $75 per hour | $150 |
| Conduit stubs from hinge to ceiling | | $50 |
| Programming | 1 hour at $75 per hour | $75 |
| Sub total | | $1530 |
| Warranty, overhead and profit at 15% | | $230 |
| Access door total | | $1760 |

Table 2 illustrates an installation estimate for the door 10 of FIG. 1B, using the invention's access control module 2000, indicating a total of $1,760 (US), less than half the estimated cost of the prior art approach.

The invention includes a preferred mechanism for controlling access through a door 10. The mechanism, known herein as the access control module 2000, electrically couples to security and power networks through a merged power-communication cable 50 as shown in FIGS. 1B and 16B. FIGS. 2A, 3A, 4A to 5A, and 9 show examples of the invention's access control module 2000. When installed, the access control module 2000 preferably couples with a position magnet 46 located in a strike plate 60 mounted in the door frame 8. The access control module 2000 may preferably include an access control identification mechanism 20, an access controlled door lock 80, a door position sensor 40, and a Request Exit switch 30. The invention includes many alternatives of the elements of the access control module, which will be disclosed in the detailed description to follow.

The merged power-communication cable 50, shown in the Figures, uses a single cable to provide both a communications protocol and to distribute power. The merged power-communications cable will support both delivering electrical power and providing at least one communications channel. The merged power-communication cable 50 includes at least two wires. One example of a merged power-communication cable 50 is the various versions of the Power over Ethernet (PoE) cable standard. The Power over Ethernet cable may preferably support a standard CAT-5 or CAT-6 cable.

The use of the merged power-communication cable 50 to exclusively supply all electrical power and communications to the access control module 2000 in the door 10 has numerous advantages. The invention includes a door conduit 300 as shown in FIGS. 2C to 2E. Each door conduit 300 includes exactly the merged power-communication cable 50 conveyed in a protected passage 302 between a first conduit opening 304 and a second conduit opening 306, which are mounted on the door frame 8 and door hinge side 12.

Figure 2A:
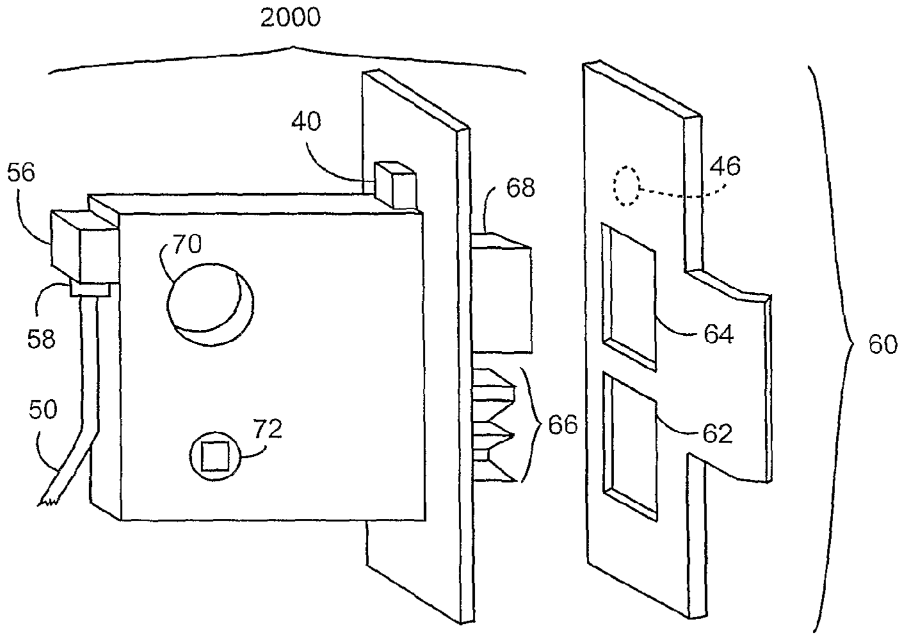
FIG. 2A shows a preferred embodiment of the access control module, the merged power-communication cable, and the strike plate of FIG. 1B.
Figure 2B:
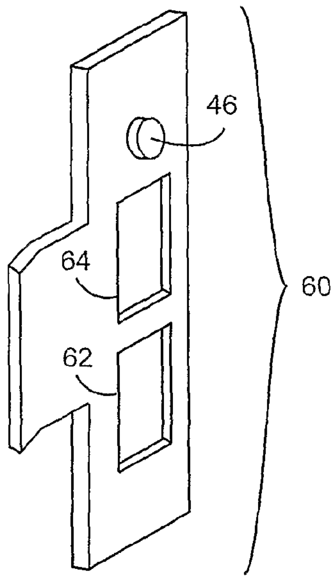
FIG. 2B shows the door frame side of the strike plate of FIG. 2A.
Figure 2C:
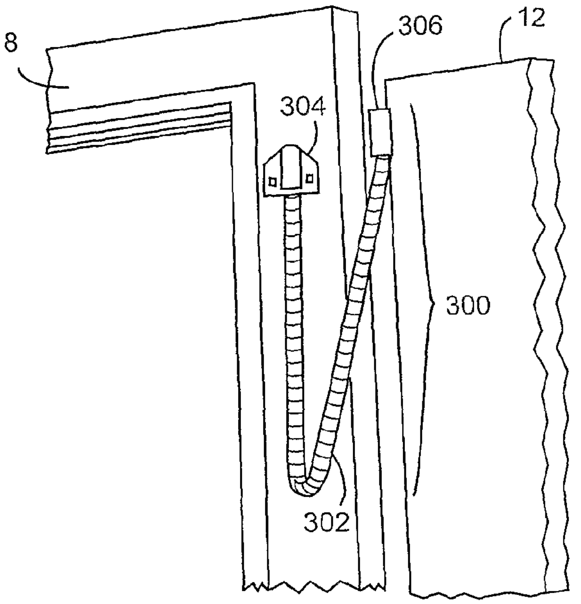
FIGS. 2C to 2E show alternative embodiments of the hinge conduit of FIGS. 1B, 2A, 3A, 3D, 4A, 4B, and 16B, used to provide the merged power-communication cable.
Figure 2D:
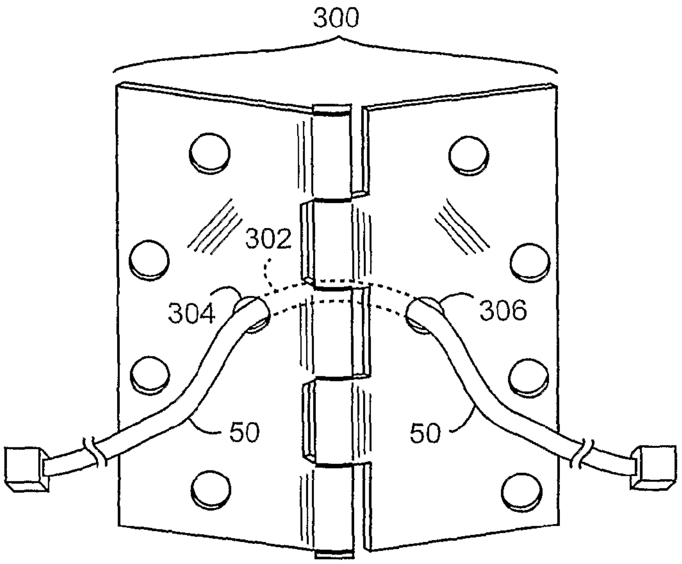
Figure 2E:
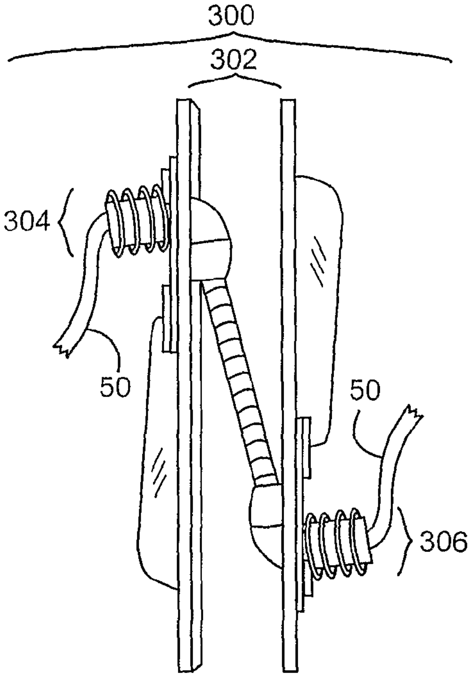

The merged power-communication cable 50 may further preferably include at least one merged power-communication coupling 48 as shown in FIG. 2A. As shown in FIG. 2C, the merged power-communication cable 50 may preferably include two of the merged power-communication couplings 48. The merged power-communication coupling 48 may further preferably embody a RJ-45 connector. The access control module 2000 may further preferably include a power-communications mating coupling 56 for coupling to the merged power-communication coupling 48 as shown in FIG. 2A.

The invention includes a preferred module for controlling access through the door 10, which electrically couples to security and power networks through the merged power-communication cable 50. This module is an example of the invention's access control module 2000 as shown in FIGS. 1B, 2A, 3A, 4A to 5A, 7B, and 9. The access control module 2000 preferably includes an access control identification mechanism 20, an access controlled door lock 80, a door position sensor 40, and a Request Exit switch 30.

The invention includes the door 10 made using the access control module 2000 as shown in FIGS. 1B, 3A, 4A, 4B, and 16B. The door conduit 300 may be assembled on the door hinge side 12 of the door 10 as shown in FIGS. 2B to 2D, and 3D. The invention includes the door 10 mounted in the door frame 8. Preferably, the position magnet 46 is included in the strike plate 60 supporting alignment of the door position sensor 40 by aligning the first latch 66 to the first latch entry 62 included in the strike plate 60, as shown in FIGS. 2A and 2B. It may be further preferred that a dead bolt latch 68 also align to a second latch entry 64 in the strike plate 60. The position magnet 46 is further preferred to be located on the face of the strike plate 60 facing the door frame 8.

Figure 3A:
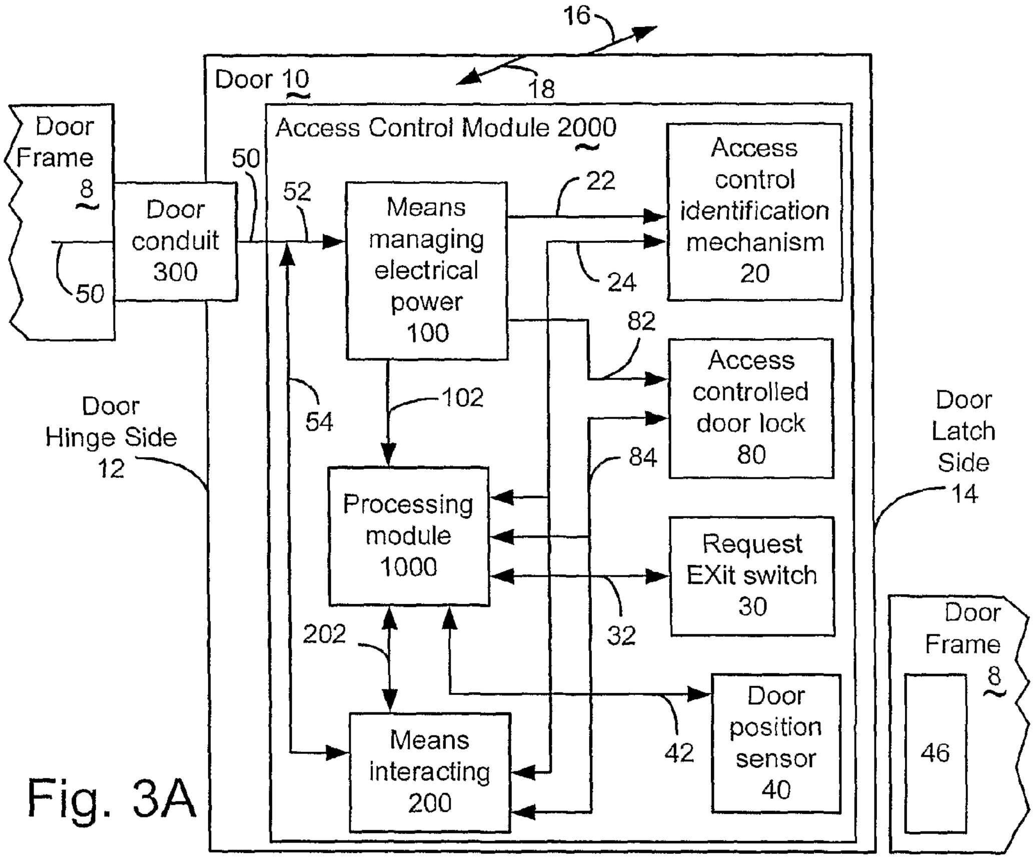
FIG. 3A shows the door coupled with the door conduit providing a merged power-communication cable into the door to certain embodiments of the access control module of FIGS. 1B and 2A.
Figure 3B:
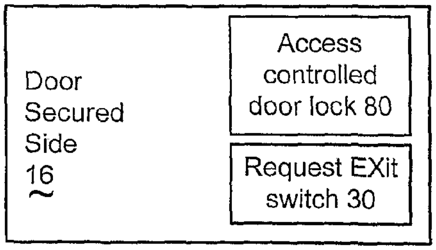
FIG. 3B shows a typical view of the secured side of the door of FIGS. 1B and 3A, including the access controlled door lock, and the REquest eXit switch.
Figure 3C:
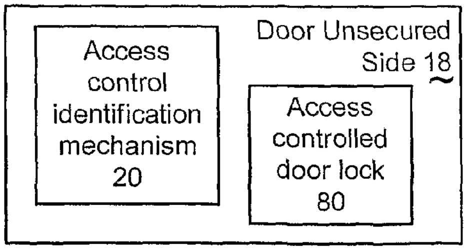
FIG. 3C shows a typical view of the unsecured side of the door of FIGS. 1B, 3A, and 3B, including at least one access control identification mechanism and the access controlled door lock.

In FIGS. 1A and 1B, the Request Exit Switch 30 is available for use on the secure door side 16 as further shown in FIG. 3B. The access control identification mechanism 20 is available on the unsecured door side 18 of the door 10 as shown in FIG. 3C. A typical application, such as in a hotel, has the secure door side 16 of the door 10 facing the interior of a room, apartment, and/or suite. Often, the request exit switch 30 is built into an integrated door lock, which also includes the access controlled door lock 80. In many situations, the access controlled door lock 80 and the Request eXit switch 30 may be integrated into a single lock set. This is often the preferred mode of the invention. A typical view of the unsecured door side 18 includes at least one access control identification mechanism 20 and the access controlled door lock 80.

Figure 3D:
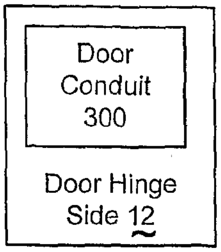
FIG. 3D shows the hinge side of the door at which the door conduit of FIGS. 1B and 3A couples with the door frame.
Figure 3E:
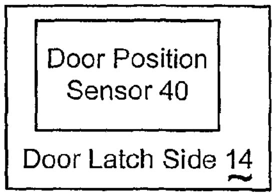
FIG. 3E shows a placement of the door position sensor on the door latch side of the door of FIGS. 1B and 3A.

The door position sensor 40 of FIGS. 3A and 3E may include an open circuit presenting two contacts, which couple with a conductive strip 46 mounted in the door frame 8. Alternatively, the door position sensor 40 may interact with a position magnet 46 mounted in the door frame 8. The door position sensor 40 may preferably be located at the top of the door 10, adjacent to the door frame 8, and not necessarily visible.

Figure 8A:
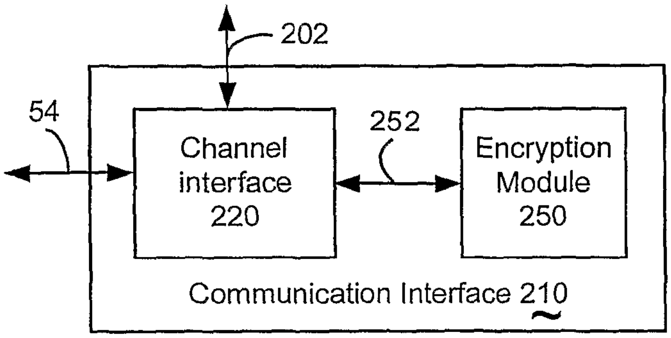
FIG. 8A shows a communication interface including a channel interface cryptically coupled with the encryption module, and providing the first communications coupling.
Figure 8B:
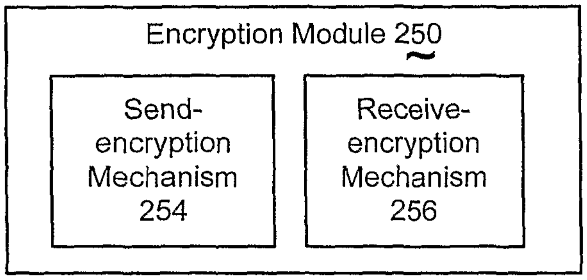
FIG. 8B shows the encryption module including at least one of a send-encryption mechanism and/or a receive-encryption mechanism.
Figure 8C:
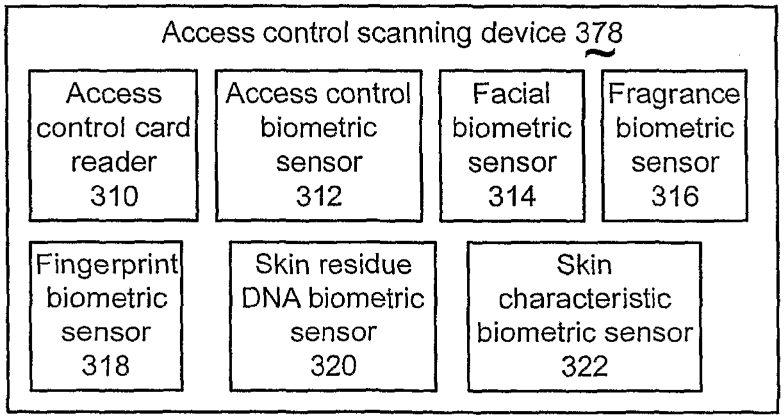
FIG. 8C shows that an access control scanning device may include at least one of the following: the access control card reader, the access control biometric sensor, which may in turn include any of the following: a facial biometric sensor, a fragrance biometric sensor, a fingerprint biometric sensor, a skin residue DNA biometric sensor, and a skin characteristic sensor.
Figure 9:
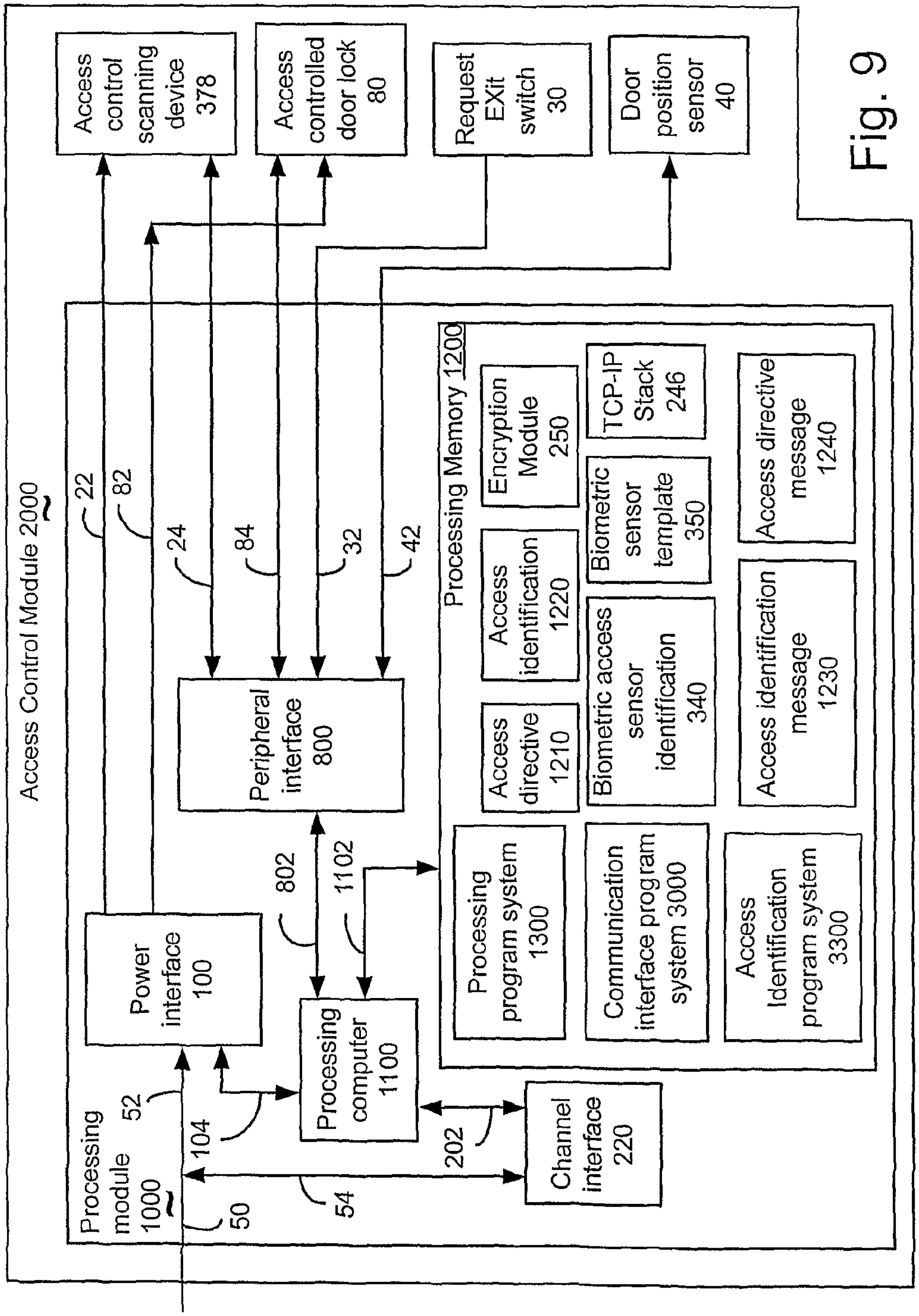
FIG. 9 shows a preferred implementation of the access control module of FIGS. 1B, 2A, 3A, and 4A to 5A, including the processing computer, the power interface, the channel interface, and the peripheral interface.

The access control identification mechanism 20 of FIGS. 2A, 3A, 4A to 5A, and 9, may preferably include an access control scanning device 378 as shown in FIGS. 8C and 9, which is further preferred to include an access control card reader 310. The access control identification mechanism 20 may include an access control biometric sensor 312. The access control biometric sensor 312 may include at least one of the following. A facial biometric sensor 314. A fragrance biometric sensor 316. A fingerprint biometric sensor 318. A skin residue DNA biometric sensor 320. And a skin characteristic biometric sensor 322.

Figure 7A:
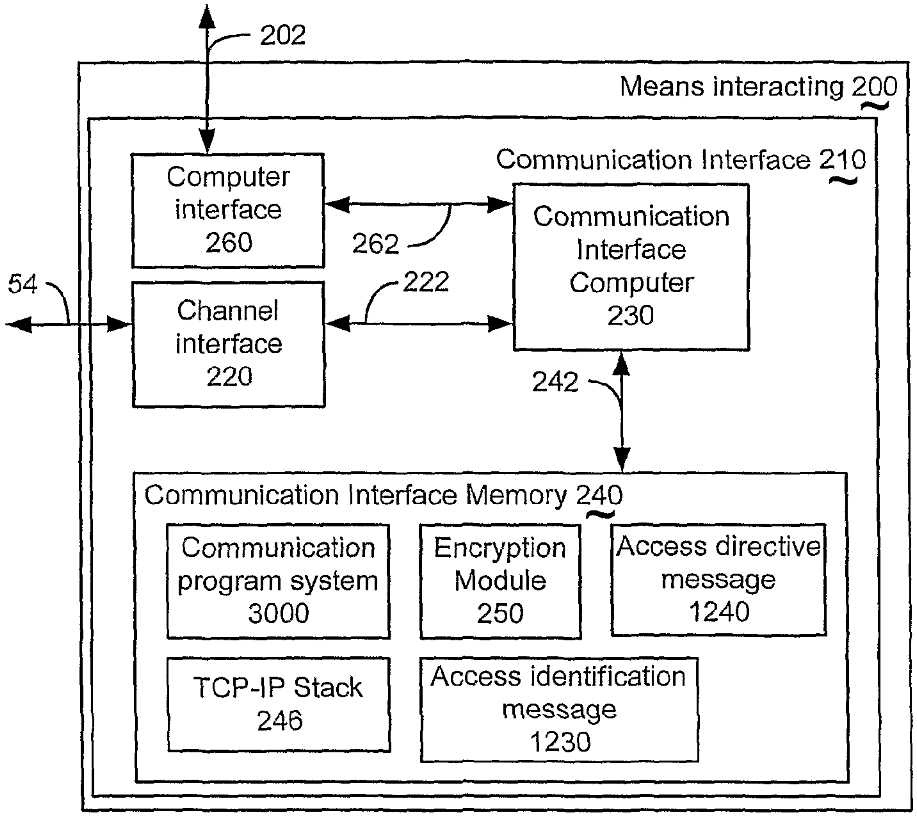
FIG. 7A shows an embodiment of the communication interface of FIGS. 6A and 6B including a communication interface computer.
Figure 7B:
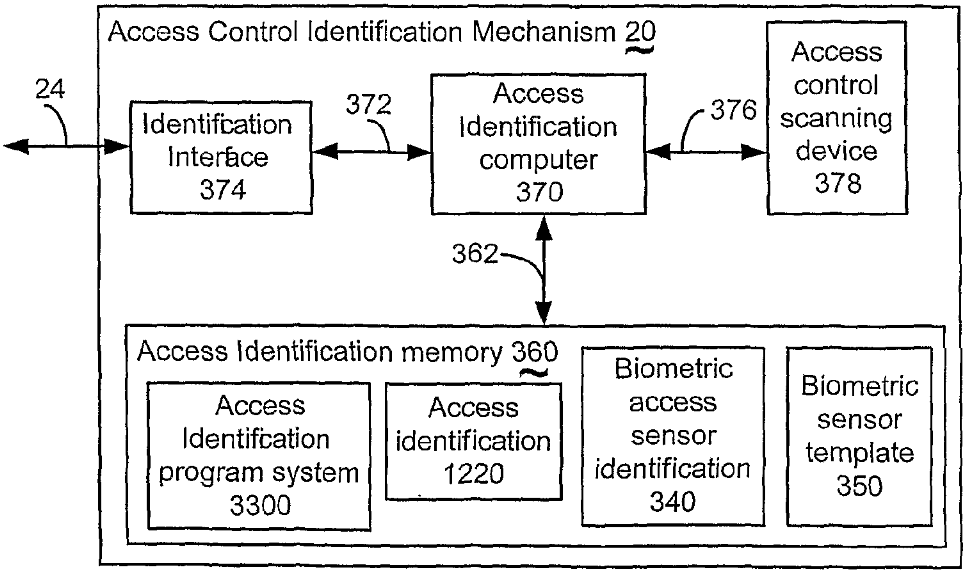
FIG. 7B shows an embodiment of the access control identification mechanism including an access identification computer, an access control scanning device, an identification interface, and an access identification memory.

In certain preferred embodiments, the access control scanning device 378 of FIG. 7B is an access control card reader 310. In certain preferred embodiments, there may be more than one access control scanning device 378. To simplify the discussion and Figures, this discussion will focus on just one such device. This is not meant to limit the scope of the claims.

In certain preferred embodiments, an access control biometric sensor 312 may be used. This may lead to creating a biometric access sensor identification 340. Creating the biometric access sensor identification 340 may further involve the use of a biometric sensor template 350.

The invention includes a method of controlling access to the door 10 using the merged power-communication cable 50. Electrical power 52 is provided from the merged power-communication cable through the means for managing 100 electrical power to a processing module 1000, the access control identification mechanism 20 and the access controlled door lock 80. The processing module 1000 interacts 200 with the access control identification mechanism 20 and with the merged power-communication cable 50 to control the access controlled door lock 80. The processing module 1000 and the access controlled door lock 80 are located in the door 10. Preferably, the access control identification mechanism 20 is also located in the door 10.

The access control module 2000 preferably implements this method. The access control module 2000 preferably includes the following: The means for managing 100 electrical power from the merged power-communication cable 50 to the processing module 1000, the access control identification mechanism 20 and the access controlled door lock 80, as shown in FIGS. 3A, 5A, 5B, 6B and 9. The means for interacting 200 between the processing module 1000, the merged power-communication cable 50 and the access control identification mechanism 20 is used to control 84 the access controlled door lock 80 as shown in FIGS. 3A, and 4A to 5B.

In FIG. 3A, the access control module 2000 includes the following. A means for managing 100 electrical power 52 from the merged power-communication cable 50 to the processing module 1000, the access control identification mechanism 20 and the access controlled door lock 80. And includes a means for interacting 200 with the processing module 1000, the merged power-communication cable 50 and the access control identification mechanism 20 to control 84 the access controlled door lock 80. The access control module 2000 preferably includes a processing module 1000, an access control identification mechanism 20, an access controlled door lock 80, a request exit switch 30, and a door position sensor 40. Preferably the processing module 1000 is interacting 200 with at least one communication channel 54 of the merged power-communication cable 50.

The invention includes operating the processing module 1000 in the door 10 to control access through the door 10 as shown in FIGS. 3A, 4A to 6B, and 9. The processing module 1000 receives at least part of the electrical power 52 from the merged power-communication cable 50. The processing module 1000 interacts with the access control identification mechanism 20 and with the merged power-communication cable 50 to control the access controlled door lock 80.

There are numerous alternative interconnection, control and communication schemes which various embodiments of the access control module 2000 may use. As a starting point, consider the processing module 1000 of FIG. 3A, and FIG. 4A to FIG. 5B including a processing computer 1100, which is first accessibly coupled 1102 to the processing memory 1200, as shown in FIGS. 6A, 6B and 9. The processing memory 1200 includes the processing program system 1300, the access identification 1220, and access directive 1210. The processing memory 1200 may further preferably include the access identification message 1230 and/or the access directive message 1240.

In FIGS. 6A, 6B, and 9, the processing computer 1100 uses the first communications coupling 202 to communicate via the communication interface 210 with the communication channel 54. The communication interface 210 may preferably embody an implementation of the means for interacting 200.

In FIGS. 6A, 6B, and 9, the processing computer 1100 uses the peripheral interface coupling 802 to communicate and control via the peripheral interface 800. The processing computer 1100 communicates and controls the access control identification mechanism 20 via the access identifier coupling 24 and via the peripheral interface 800. The processing computer 1100 communicates and controls the access controlled door lock 80 via the access control coupling 84 and via the peripheral interface 800. The processing computer 1100 communicates and controls the Request EXit Switch 30 to provide the sensed request_to_exit state 32 via the peripheral interface 800. The processing computer 1100 communicates and controls the door position sensor 40 to provide the sensed door position 42 and via the peripheral interface 800.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network. The starting of a flowchart is denoted by an oval with the word "Start" in its interior.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. The operation of termination is denoted by an oval with the word "Exit" in its interior.

A computer as used herein will include, but is not limited to an instruction processor. The instruction processor includes at least one instruction processing element and at least one data processing element. Each data processing element is controlled by at least one of the instruction processing elements.

The invention also includes the processing module 1000 implemented as means for its operations. These means may include at least one of any of the following: a computer, a finite state machine, a neural network and an inferential engine.

The operations of the processing module 1000 may be implemented as program steps in a processing program system 1300 controlling at least one computer, the processing computer 1100. The program steps residing in a processing memory 1200 may be accessibly coupled with the processing computer 1100. As used herein, any memory may include at least one volatile memory address and/or at least one non-volatile memory address. The content of a volatile memory address may be altered by a loss of electrical power. Whereas the content of a non-volatile memory address is unaffected by the loss of electrical power.

Figure 10A:
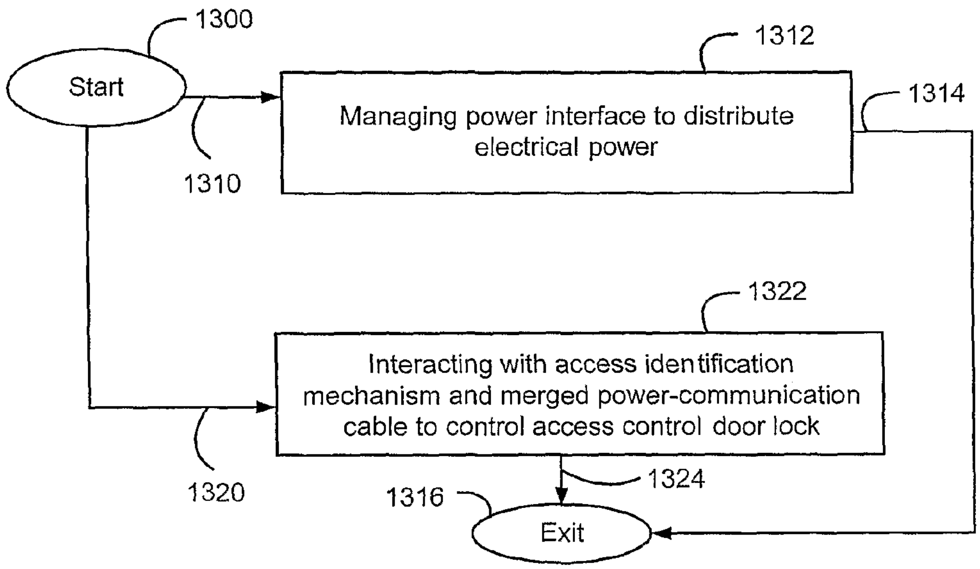
FIG. 10A shows a detail flowchart of the processing program system of FIGS. 2A, 6A, 6B, and 9.

In certain embodiments of the invention, the means for managing 100 the electrical power 52 may include a power interface 100. FIG. 10A shows a detail flowchart of the processing program system 1300 of FIGS. 6A, 6B, and 9 for the inventions method. Operation 1312 supports managing the power interface 100 to distribute the electrical power 52. Operation 1322 supports interacting with the access control identification mechanism 20 and the merged power-communication cable 50 to control 84 the access controlled door lock 80.

The means for managing 100, possibly implemented as the power interface 100, may provide a third electrical power 102 to the means for interacting 200. The means for interacting 200 may include, and/or be implemented as, a communication interface 210 interacting with the merged power-communication cable 50 as in FIGS. 5A and 5B. The power interface 100 may preferably provide a second electrical power 82 to the access controlled door lock 80.

Figure 4A:
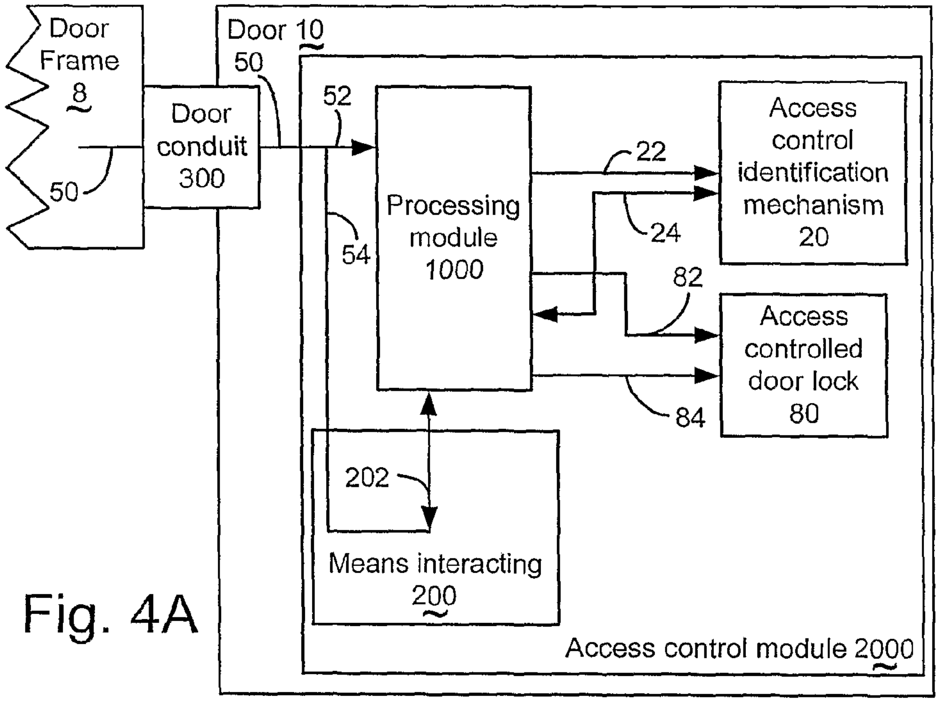
FIG. 4A shows the access control module of FIGS. 1B and 3A, where the means for interacting includes a first communications coupling between the processing module and the communication channel.

The processing module 1000 may operate as in FIG. 4A. The power interface 100 receives at least part of the electrical power 52 from the merged power-communication cable 50 and provides a third electrical power 102 to a communication interface 210 which interacts 200 with the merged power-communication cable 50. The power interface 100 may provide a second electrical power 82 to the access controlled door lock 80.

The invention also includes the processing module 1000 implemented as means for its operations. These means may include at least one of the following: a computer, a finite state machine, a neural network and an inferential engine. As used herein a computer includes at least one instruction processor and at least one data processor, where each of the data processors is controlled by at least one of the instruction processors.

The operations of the processing module 1000 may be implemented as program steps in a processing program system 1300 controlling at least one computer, the processing computer 1100, as shown in FIGS. 6A, 6B, and 9. The program steps reside in a processing memory 1200 accessibly coupled with the processing computer 1100. The processing memory 1200 may include volatile and/or non-volatile memory addresses.

FIG. 9 shows a preferred implementation of the access control module 2000 of FIG. 3A, and FIG. 4A to FIG. 5A, including the processing computer 1100, the power interface 100, the channel interface 220, and the peripheral interface 800, which have been previously discussed.

In FIG. 9, the method of operating the access control module 2000 is shown as the processing computer 1100 directed by the communications program system 3000, the access identification program system 3300, and the processing program system 1300. To simplify the discussion, these potentially separate operational aspects will be primarily discussed in terms of the processing program system 1300, with specific reference made to operations which might frequently be performed by the access identification computer 370 and/or the communication interface computer 230. One skilled in the art will recognize that some or all of these operations may just as readily be performed by the access identification computer 370 and/or the communication interface computer 230.

In certain preferred embodiments, the processing module 1000 interactions may include the following. Receiving an access identification 1220 from the access control identification mechanism 20. Incorporating the access identification 1220 to create an access directive 1210. The processing module 1000 controlling the access controlled door lock 80 based upon the access directive 1210.

Figure 10B:
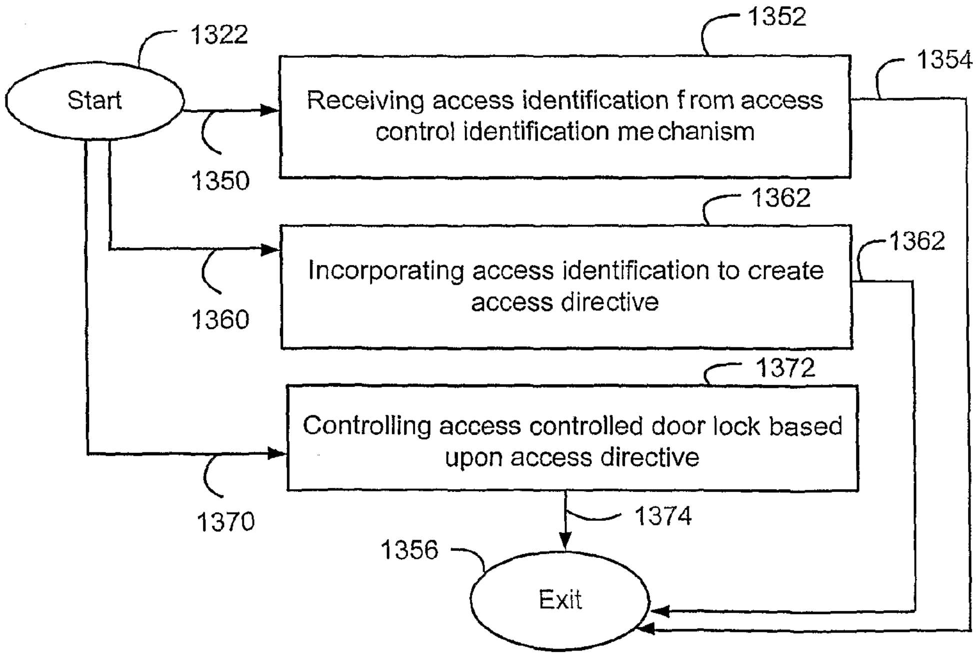
FIG. 10B shows a detail flowchart of FIG. 10A further interacting with the access control identification mechanism and the merged power-communication cable to control the access controlled door lock.

FIG. 10B shows a detail flowchart of operation 1322 of FIG. 10A interacting with the access control identification mechanism 20 and the merged power-communication cable 50 to control 84 the access controlled door lock 80. Operation 1352 supports receiving the access identification 1220 from the access control identification mechanism 20. Operation 1362 supports incorporating the access identification 1220 to create an access directive 1210. Operation 1372 supports controlling the access controlled door lock 80 based upon the access directive 1210.

In certain preferred embodiments, the processing module 1000 may further interact as follows. The processing module 1000 may receive a sensed door position 42 from a door position sensor 40. The processing module 1000 may receive a sensed request_to_exit state 32 from a Request Exit switch 30, also sometimes known as a REX switch. Controlling the access controlled door lock 80 may be further based upon the sensed door position 42, the sensed request_to_exit state 32 and the access directive 1210.

Figure 15A:
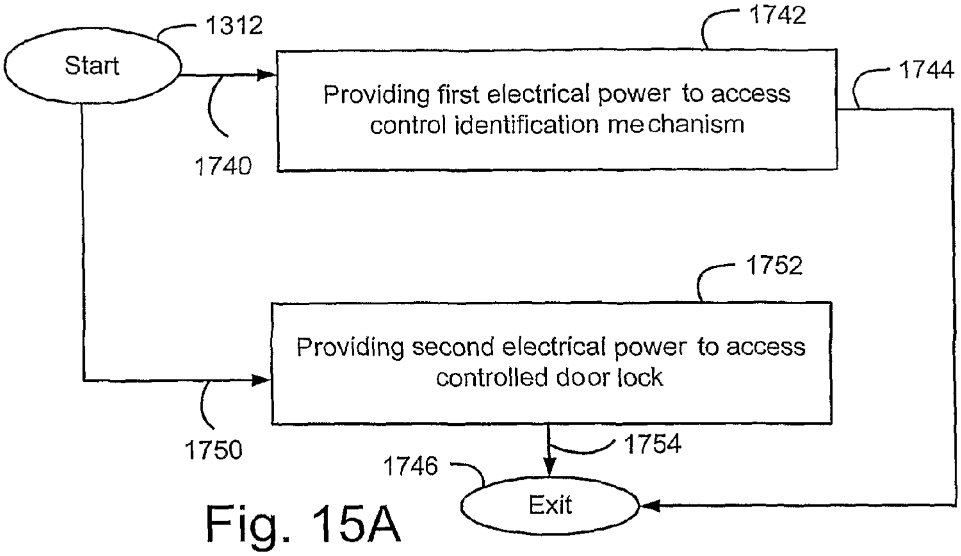
FIG. 15A shows a detail flowchart of FIG. 10A further managing the electrical power.
Figure 15B:
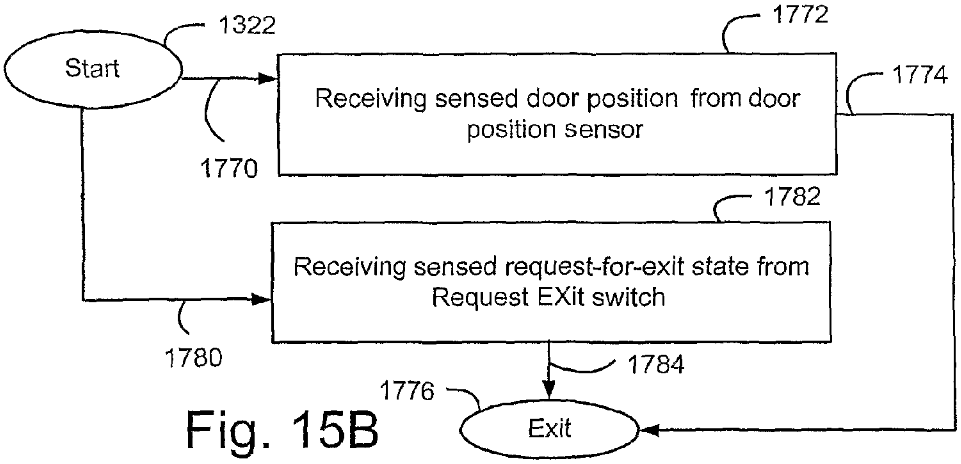
FIG. 15B shows a detail flowchart of FIG. 10A further interacting.

FIG. 15B shows a detail flowchart of operation 1322 of FIG. 10A. Operation 1772 supports receiving a sensed door position 42 from the door position sensor 40 of FIGS. 3A, 3B, 3E, 5A, and 9. Operation 1782 supports receiving a sensed request_to_exit state 32 from a Request EXit switch 30.

Figure 15C:
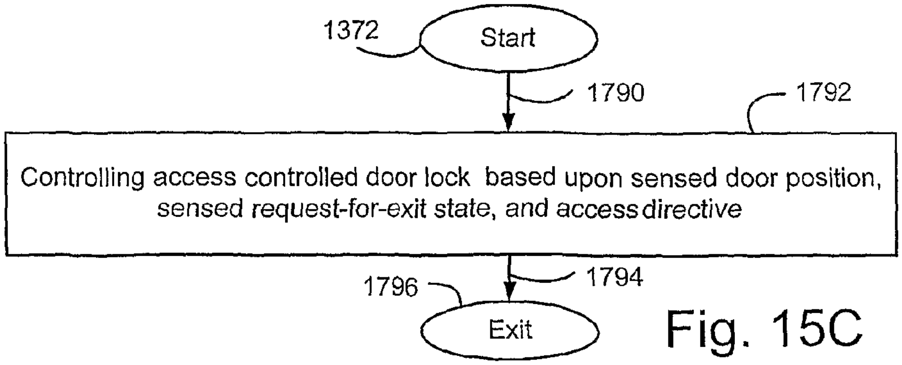
FIG. 15C shows a detail flowchart of FIG. 10B further controlling the access controlled door lock.

FIG. 15C shows a detail flowchart of operation 1372 of FIG. 10B further controlling the access controlled door lock 80. Operation 1792 supports controlling the access controlled door lock 80 based upon the sensed door position 42, the sensed request_to_exit state 32, and the access directive 1210.

Figure 8D:
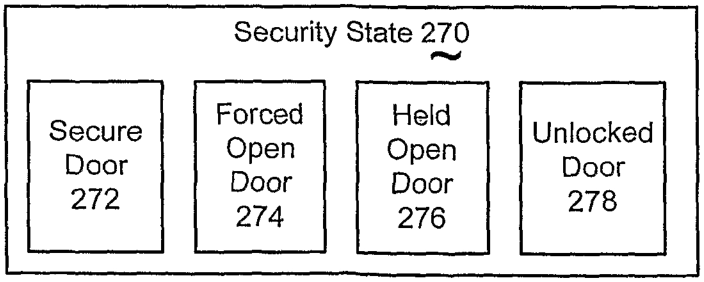
FIG. 8D shows a security state for the door, which may take any one of the values of a secure door, a forced open door, a held open door, and an unlocked door.
Figure 16A:
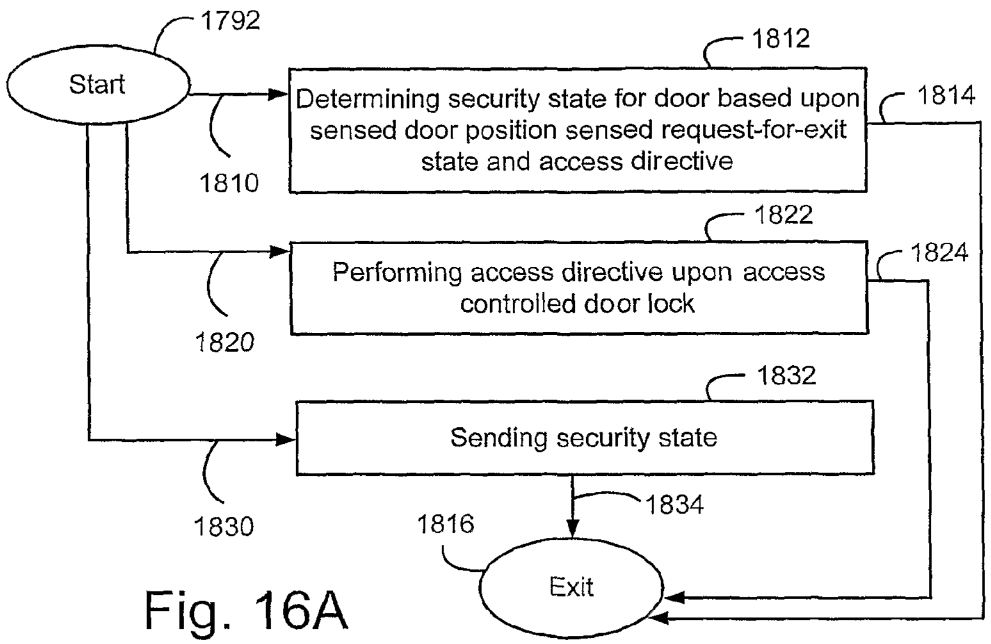
FIG. 16A shows a flow chart in accord with example embodiments of the invention.
Figure 16B:
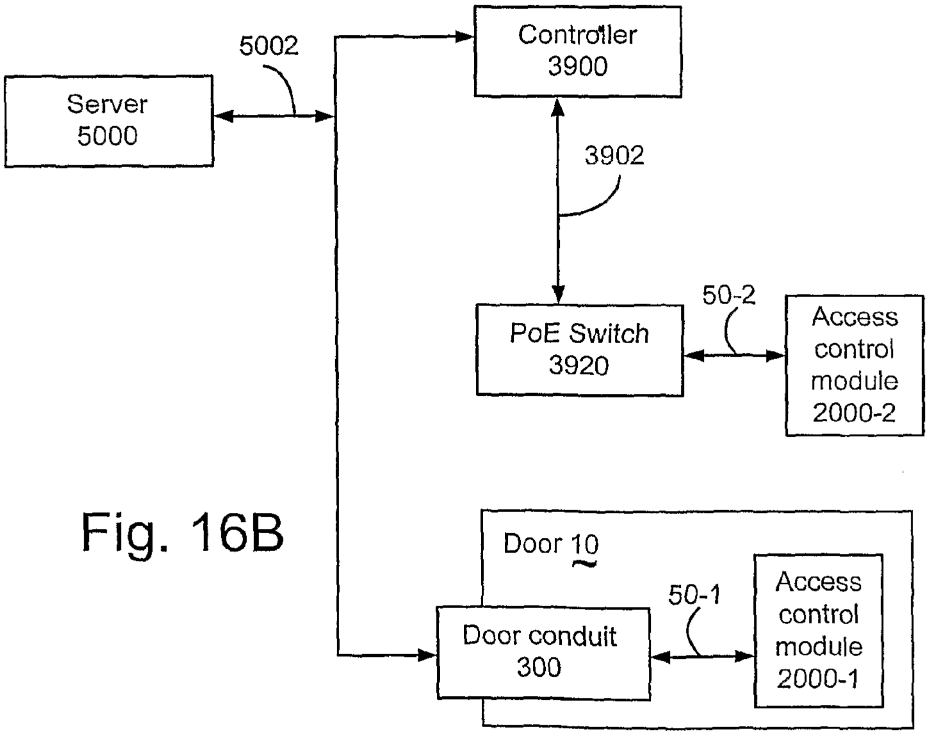
FIG. 16B shows an example door configuration.

FIG. 16A shows a detail flowchart of operation 1792 of FIG. 15C further controlling the access controlled door lock 80. Operation 1812 supports determining a security state 270 of FIG. 8D for the door 10 based upon the sensed door position 42, the sensed request_to_exit state 32, and the access directive 1210. Operation 1822 supports performing the access directive 1210 upon the access controlled door lock 80. Operation 1832 supports sending the security state 270.

Figure 4B:
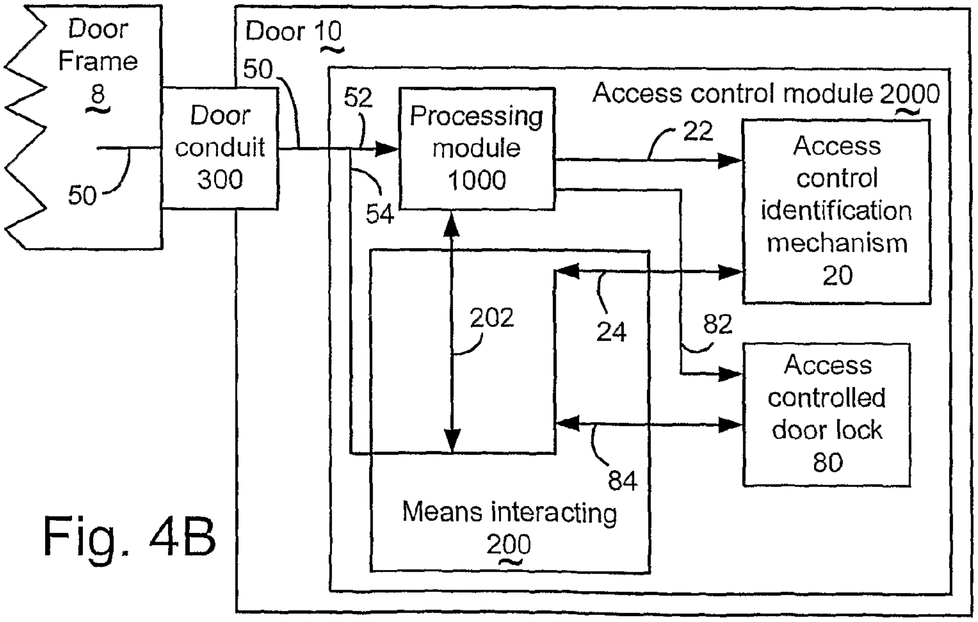
FIG. 4B shows the access control module of FIG. 4A where the means for interacting further includes the access identifier coupling to the communication channel, and the access control coupling to the communication channel.

FIG. 4A shows the access control module 2000 of FIG. 3A where the means for interacting 200 includes a first communications coupling 202 between the processing module 1000 and the communication channel 54. FIG. 4B shows the access control module 2000 of FIG. 4A where the means for interacting 200 further includes the access identifier coupling 24 to the communication channel 54, and the access control coupling 84 to the communication channel 54.

The access control module 2000 may preferably support a TCP/IP stack 246 in any of several alternative embodiments. By way of example, the communication interface 210 may support the TCP/IP stack 246 stack for interactions with the merged power-communication cable 50 as shown in FIG. 7A. The access control identification mechanism 20 may support the TCP/IP stack 246 as shown in FIG. 7B. The processing module 1000 may support the TCP/IP stack 246 as shown in FIG. 9.

The communication interface 210 may preferably include a communication interface computer 230 as shown in FIG. 7A. The communication interface computer 230 may accessibly couple with a communication interface memory 240, interactively couple with the merged power-communication cable 50 and controllably couple with the access controlled door lock 80.

Figure 17A:
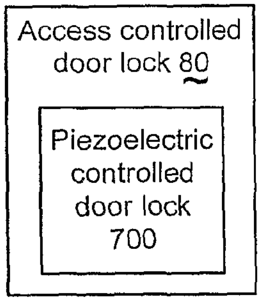
FIG. 17A shows the access controlled door lock including a piezoelectric controlled door lock.
Figure 17B:
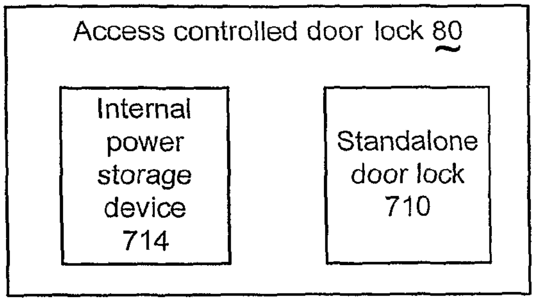
FIG. 17B shows alternatively, the access controlled door lock including a standalone door lock powered by an internal power storage device.
Figure 17C:
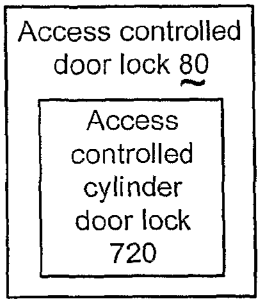
FIG. 17C shows the access controlled door lock including an access controlled cylinder lock.
Figure 17D:
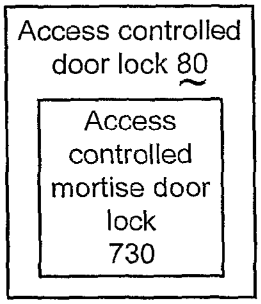
FIG. 17D shows the access controlled door lock including an access controlled mortise lock.
Figure 17E:
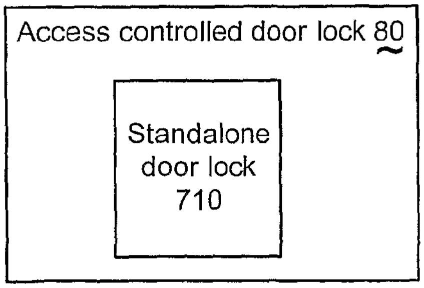
FIG. 17E shows an alternative access controlled door lock including a standalone door lock which is not powered by an internal power storage device.
Figure 17F:
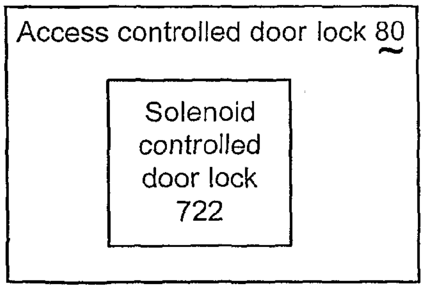
FIG. 17F shows alternatively, the access controlled door lock including a solenoid controlled door lock.

The access controlled door lock 80 may include a piezoelectric controlled door lock 700 as shown in FIG. 17A. Alternatively, the access controlled door lock 80 may include a standalone door lock 710, as shown in FIG. 17E, and powered by an internal power storage device 714, which typically drives a Direct Current (DC) motor as shown in FIG. 17B. The access controlled door lock 80 may include an access controlled cylinder door lock 720 as shown in FIGS. 2A and 17C. The access controlled door lock 80 may include an access controlled mortise door lock 730 as shown in FIG. 17D. Alternatively, the access controlled door lock 80 may include a solenoid controller door lock 722, as shown in FIG. 17F.

The invention also includes a door conduit 300 providing the merged power-communication cable 50 to at least the processing module 1000 in the door 10. The door conduit 300 includes a protected passage capable of passing the merged power-communication cable 50 from a door frame 8 conduit-opening to a door 10 conduit-opening inside the door 10. The protected passage may also act as a mechanical hinge for the door. FIG. 3D shows the door latch side 14 of the door 10 of FIGS. 1B, 2C, 2D, and 3A, where the door conduit 300 of FIG. 2C to 3A, couples with the door frame 8.

The components of the access control module 2000 may be organized in several ways to suit the needs of various environments. The processing module 1000 may includes the means for managing 100 and the means for interacting 200 as in FIGS. 5A and 5B. The means for managing 100, and/or the power interface 100, may include at least one computer, at least one finite state machine, an inferential engine and/or a neural network.

Figure 5A:
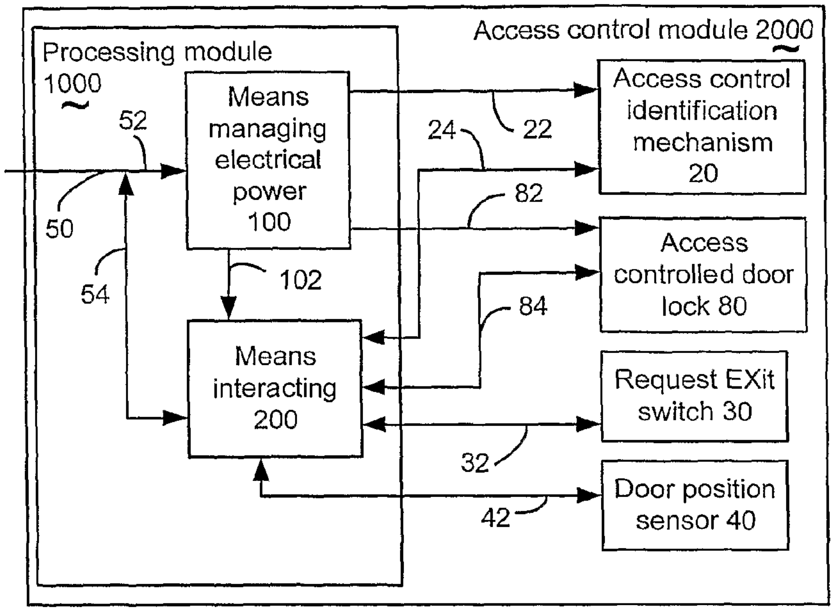
FIG. 5A shows the access control module of FIG. 3A where the processing module includes the means for managing and the means for interacting.
Figure 5B:
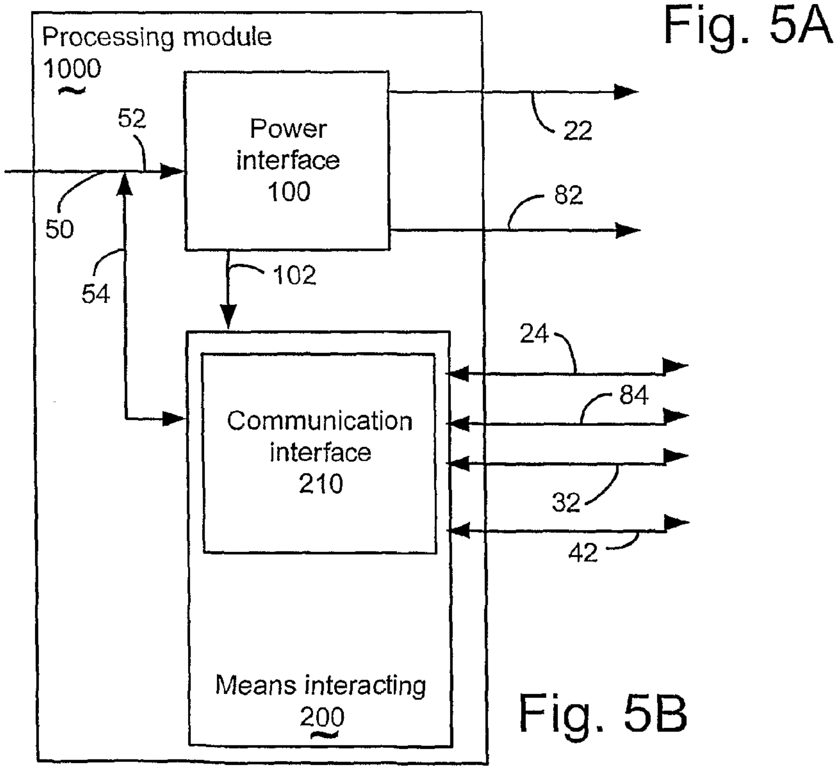
FIG. 5B shows a refinement of the processing module of FIGS. 3A, and 4A to 5A, where the communication interface, is an implementation of the means for interacting and is controllably coupled to the power interface, which is an implementation of the means for managing.
Figure 6A:
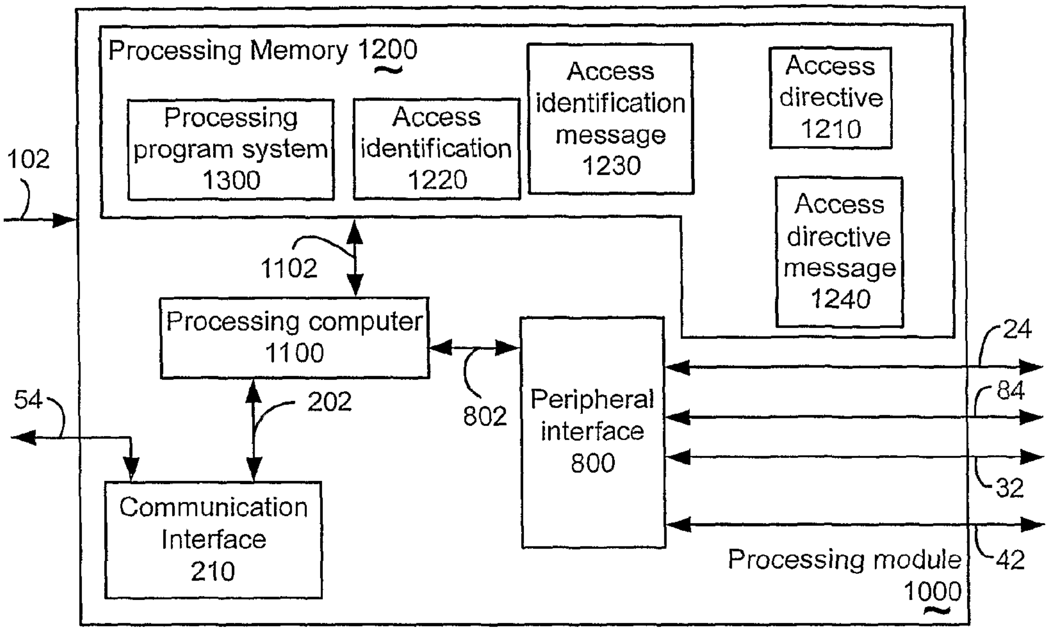
FIGS. 6A and 6B show the processing module of FIGS. 3A, and 4A to 5B, including a processing computer, which is first accessibly coupled to the processing memory.
Figure 6B:
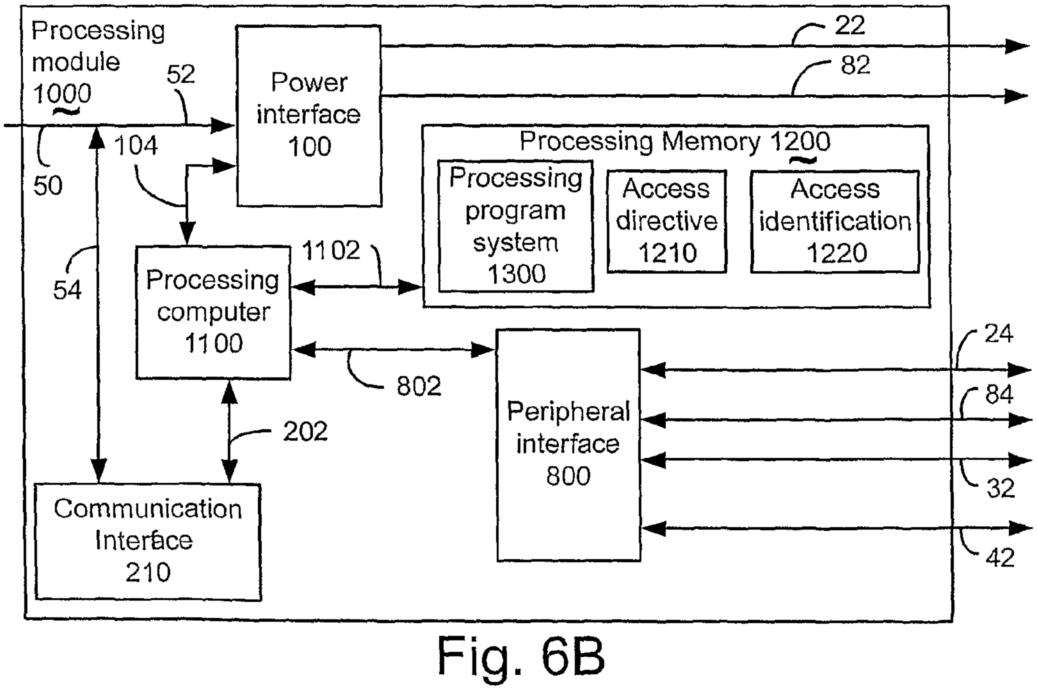

FIG. 5B shows a refinement of the processing module 1000 FIGS. 3A, and 4A to 5A. The communication interface 210, which is an implementation of the means for interacting 200, is controllably coupled 104 to the power interface 100, which is an implementation of the means for managing 100. The power interface 100 provides at least part of the electrical power 52 as a third electrical power 102 received by the means for interacting 200. There is no single central computer shown. However, either or both the power interface 100 and/or the communication interface 210 may include at least one computer.

FIG. 7A shows an embodiment of the communication interface 210 of FIGS. 6A and 6B including a communication interface computer 230. The communication interface computer 230 is second accessibly coupled 242 to the communication interface memory 240. The communications program system 3000 includes program steps residing in the communication interface memory 240 to direct the operations of the communication interface 210. The communication interface memory 240 may also include, both through use of the communications program system 3000 and other resources, the TCP/IP stack 246. The communication interface 210 may include an encryption module 250. The communication interface 210 may store the access identification message 1230 and/or the access directive message 1240. The channel interface 220 interacts with the communication channel 54 to support communication via the merged power-communication cable 50. The communication interface computer 230 is fifth coupled 222 with the channel interface 220.

The access control identification mechanism 20 of FIGS. 2A, 3A, 4A to 5A, and 9 may include the following. FIG. 7B shows an embodiment of the access control identification mechanism 20, which includes an access identification computer 370, an access control scanning device 378, an identification interface 374, and an access identification memory 360. The access identification computer 370 is third accessibly coupled 362 to the access identification memory 360. The access identification program system 3300 includes at least one program step residing in the access identification memory 360, which implements, at least in part, the access identification method(s) used by the invention's embodiments. The access identifier coupling 24 interacts with the identification interface 374. The identification interface 374, in turn, access-ident-couples 372 with the access identification computer 370. The access identification computer 370 access-ID-couples 376 with the access control scanning device 378. The access identification computer 370, directed by program steps of the access identification program system 3300, communicates via the access-ID-couples 376 with the access control scanning device 378 to create the access identification 1220.

The discussion of the means for interacting 200, and more specifically the communication interface 210 continues. FIGS. 7A, 8A, and 9 show the communication interface 210 including a channel interface 220, which provides the first communications coupling 202. The channel interface 220 couples with at least one communication channel 54.

The operation of the access control module 2000 may include using encryption to limit the potential compromising the data content through reading or writing on the security network 5002 shown in FIG. 16B. Interactions of the processing module 1000 with the merged power-communication cable 50 may use encryption.

In FIG. 8A, the channel interface 220 is cryptically coupled 252 with the encryption module 250. FIG. 8B shows the encryption module 250 including at least one of a send-encryption mechanism 254 and/or a receive-encryption mechanism 256.

In FIGS. 3A, 4A to 5A, and 9, the processing module 1000 interacts 200 with the access control identification mechanism 20, and with the merged power-communication cable 50, to control 84 the access controlled door lock 80. At least the processing module 1000 and the access controlled door lock 80 are located in the door 10. Preferably, the access control identification mechanism 20 is also located in the door 10.

Figure 11A:
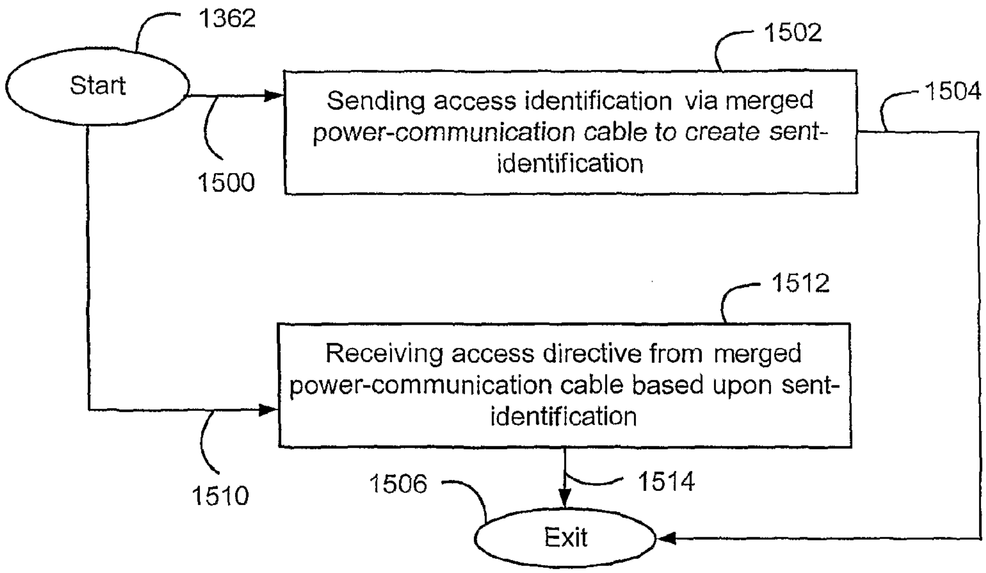
FIG. 11A shows a detail flowchart of FIG. 10B further incorporating the access identification to create an access directive.

FIG. 11A shows a detail flowchart of operation 1362 of FIG. 10B further incorporating the access identification 1220 to create an access directive 1210. Operation 1502 supports sending the access identification 1220 via the merged power-communication cable 50 to create a sent-identification. Operation 1512 supports receiving the access directive 1210 from the merged power-communication cable 50 based upon the sent-identification.

Figure 11B:
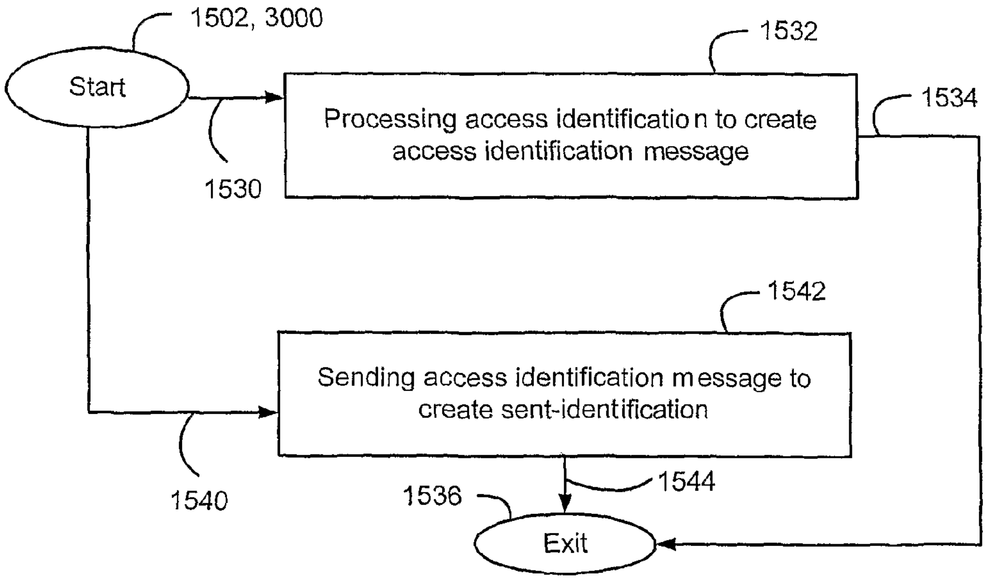
FIG. 11B shows a detail flowchart of FIG. 11A, and alternatively, part of the communications program system of FIGS. 7A and 9, for sending the access identification via the merged power-communication cable to create a sent-identification.

FIG. 11B shows a detail flowchart of operation 1512 of FIG. 11A, and alternatively, part of the communications program system 3000 of FIGS. 7A and 9, for sending the access identification 1220 via the merged power-communication cable 50 to create a sent-identification. Operation 1532 supports processing the access identification 1220 to create an access identification message 1230. Operation 1542 supports sending the access identification message 1230 to create the sent-identification.

Figure 12A:
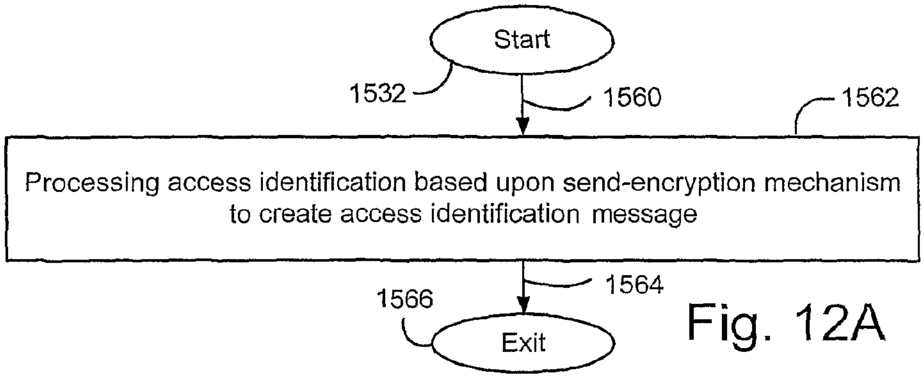
FIG. 12A shows a detail flowchart of FIG. 11B, further processing the access identification.

FIG. 12A shows a detail flowchart of operation 1532 of FIG. 11B, further processing the access identification 1220. Operation 1562 supports processing the access identification 1220 based upon the send-encryption mechanism 254 of FIG. 8B to create the access identification message 1230.

Figure 12B:
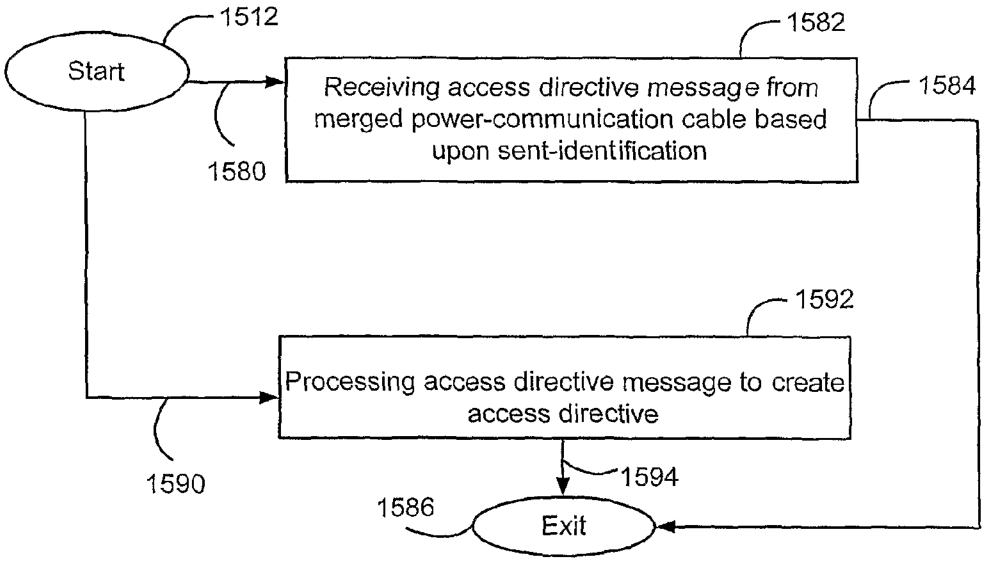
FIG. 12B shows a detail flowchart of FIG. 11A, and part of the communications program system of FIGS. 7A and 9, for receiving the access directive.

FIG. 12B shows a detail flowchart of operation 1512 of FIG. 11A, and part of the communications program system 3000 of FIGS. 7A and 9, for receiving the access directive 1210. Operation 1582 supports receiving an access directive message 1240 from the merged power-communication cable 50 based upon the sent-identification. Operation 1592 supports processing the access directive message 1240 to create the access directive 1210.

Figure 12C:
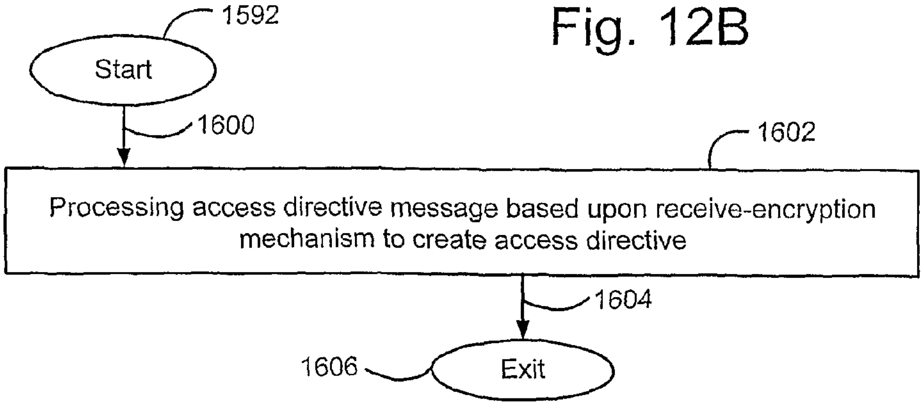
FIG. 12C shows a detail flowchart of FIG. 12B further processing the access directive message to create the access directive.

FIG. 12C shows a detail flowchart of operation 1592 of FIG. 12B further processing the access directive message 1240 to create the access directive 1210. Operation 1592 supports processing the access directive message 1240 based upon the receive-encryption mechanism 256 of FIG. 8C to create the access directive 1210.

Figure 13:
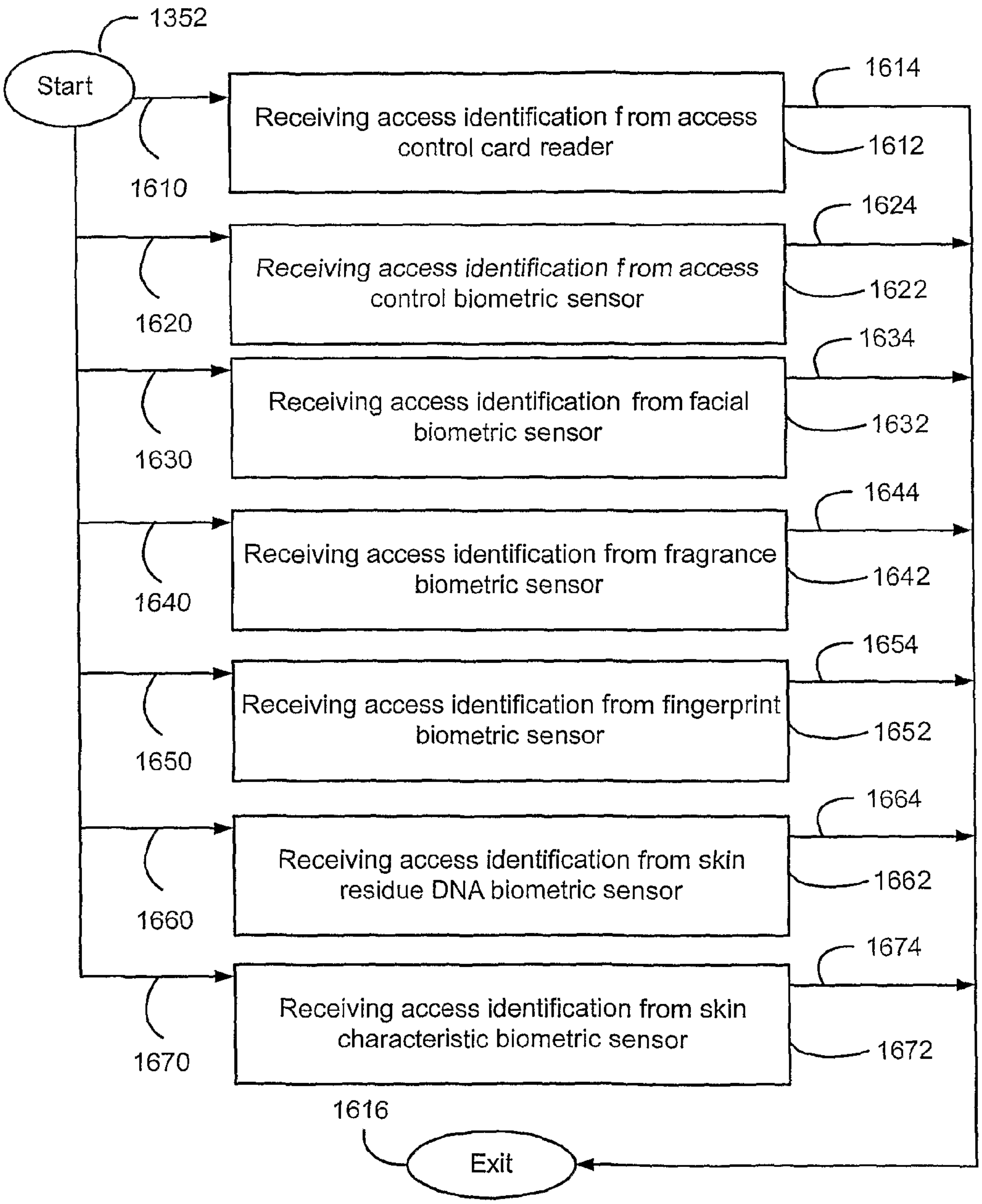
FIG. 13 shows a detail flowchart of FIG. 10B further receiving the access identification.

The discussion of the access control identification mechanism 20 continues. FIG. 13 shows a detail flowchart of operation 1352 of FIG. 10B further receiving the access identification 1220. Operation 1612 supports receiving the access identification 1220 from the access control card reader 310 of FIG. 8C. Operation 1622 supports receiving the access identification 1220 from the access control biometric sensor 312. Operation 1632 supports receiving the access identification 1220 from a facial biometric sensor 314. Operation 1642 supports receiving the access identification 1220 from a fragrance biometric sensor 316. Operation 1652 supports receiving the access identification 1220 from a fingerprint biometric sensor 318. Operation 1662 supports receiving the access identification 1220 from a skin residue DNA biometric sensor 320 or a skin characteristic biometric sensor 322.

Figure 14A:
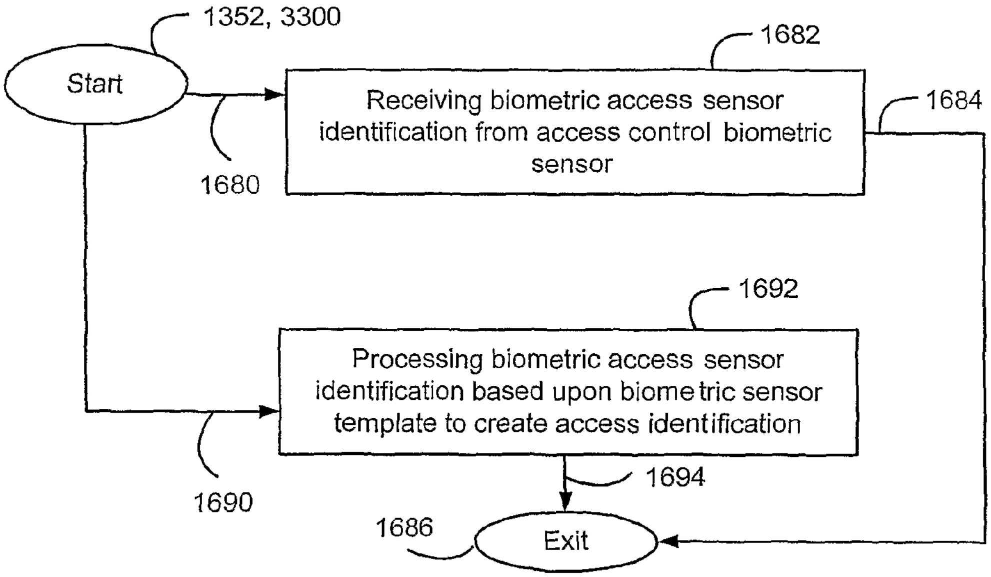
FIG. 14A shows a detail flowchart of FIG. 10B, alternatively part of the access identification program system of FIGS. 7B and 9, further receiving the access identification.

The discussion of receiving the access identification 1220 continues. FIG. 14A shows a detail flowchart of operation 1352 of FIG. 10B, alternatively part of the access identification program system 3300 of FIGS. 7B and 9. Operation 1682 supports receiving a biometric access sensor identification 340 from the access control biometric sensor 312. Operation 1692 supports processing the biometric access sensor identification 340 based upon the biometric sensor template 350 to create the access identification 1220.

Figure 14B:
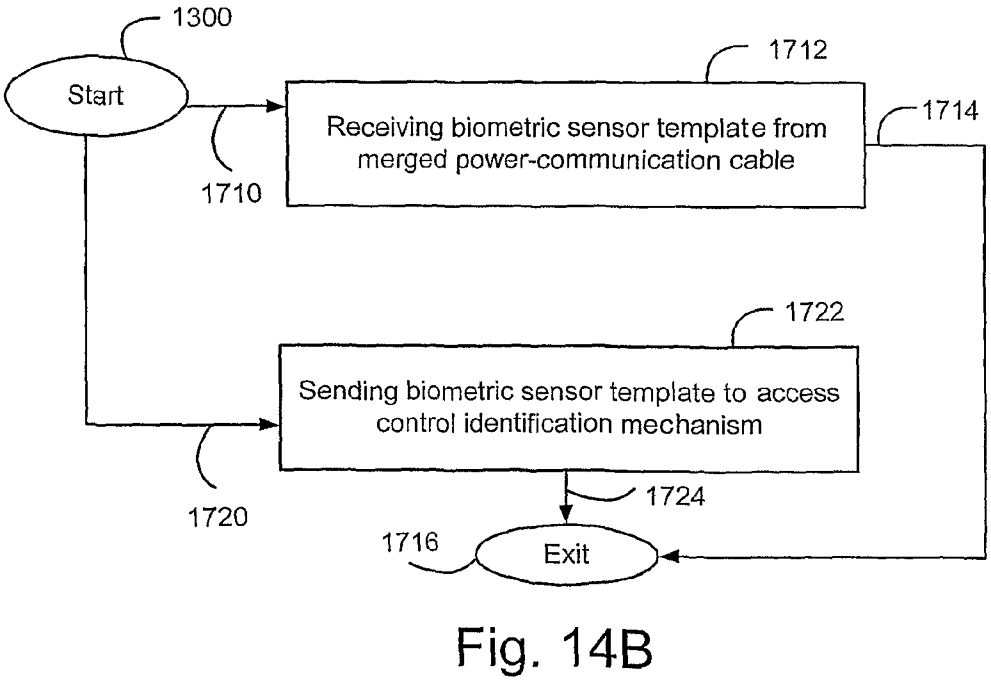
FIG. 14B shows a detail flowchart of the processing program system of FIGS. 6A, 6B and 9.

The discussion of the biometric sensor template 350 continues. FIG. 14B shows a detail flowchart of the processing program system 1300 of FIGS. 6A, 6B and 9. Operation 1712 supports receiving the biometric sensor template 350 from the merged power-communication cable 50. Operation 1722 supports sending the biometric sensor template to the access control identification mechanism.

The discussion of managing the electrical power 52 continues. FIG. 15A shows a detail flowchart of operation 1312 of FIG. 10A. Operation 1742 supports providing a first electrical power 22 to the access control identification mechanism 20. Operation 1752 supports providing a second electrical power 82 to the access controlled door lock 80.

The discussion of the use of various aspects of the invention in a security network 5002 continues. FIG. 16B shows the door 10 made with a first instance 2000-1 of the access control module 2000 coupled by a first cable instance 50-1 of the merged power-communication cable 50. The first cable instance 50-1 is routed through the door conduit 300 to the security network 5002. The first cable instance 50-1 may be seen in network diagrams to be a direct part of the security network 5002.

In FIG. 16B, the second instance 2000-2 of the access control module 2000 is shown to couple by a second cable instance 50-2 of the merged power-communication cable 50 to a Power over Ethernet switch 3920. The Power over Ethernet switch 3920 may communicatively couple 3902 to a controller 3900, all of which may be included in a local security closet. The controller 3900 may be shown in network diagrams communicating over the security network 5002 with a server 5000. The server 5000 may have dedicated security activities, or else provide a transfer point to a security management station which may be located at a distance from the door 10 and/or the server 5000.

The preceding embodiments have been provided by way of example and are not meant to constrain the scope of the following claims.

What is claimed is:

1. An access control module for controlling access through a door, the access control module comprising:

a power interface coupled to a merged power-communication cable and controllably coupled to a processing computer in a processing module;

said power interface providing electrical power to an access control identification mechanism;

said power interface providing electrical power to an access controlled door lock;

said power interface providing electrical power to a communication interface; and wherein the processing module comprises:

said processing computer accessibly coupled with a processing memory containing at least one program step of a processing program system directing said processing computer;

said processing computer communicatively coupled with said communication interface coupled with said merged power-communication cable;

said processing computer coupled with a peripheral interface coupled with said access control identification mechanism, with said merged power-communication cable, with a door position sensor, with a request-to-exit switch, and with said access controlled door lock;

wherein said processing program system comprises the program steps of:

managing said power interface to distribute part of the electrical power to the processing module, to provide a first electrical power to the access control identification mechanism and to provide a second electrical power to the access controlled door lock; and controlling said access controlled door lock based upon interactions with said access control identification mechanism, with said door position sensor, with said request-to-exit switch, and with said merged power-communication cable.

2. The access control module of claim 1, wherein said merged power-communication cable implements a form of Power Over Ethernet (PoE) protocol.

3. The access control module of claim 1, wherein the program step of controlling said access controlled door lock, comprises the program steps of:

receiving an access identification from said access control identification mechanism;

incorporating said access identification to create an access directive; and controlling said access controlled door lock based upon said access directive.

4. The access control module of claim 3, wherein the program step of receiving an access identification from the access control identification mechanism comprises the program steps of:

sending the access identification to the merged power-communication cable to create a sent-identification;

receiving an access directive message from said merged power-communication cable based upon said sent-identification; and processing said access directive message to create said access directive.

5. The access control module of claim 3, wherein the processing program system further comprises the program steps of:

receiving a sensed door position from a door position sensor;

receiving a sensed request-to-exit state from a Request Exit (REX) switch; and wherein the program step of controlling said access controlled door lock further comprises the program step of:

controlling said access controlled door lock based upon said sensed door position, said sensed request-to-exit state, and said access directive.

6. The access control module of claim 5, wherein the program step controlling said access controlled door lock comprises the program steps of:

determining a security state for said door based upon said sensed door position, said sensed request-to-exit state, and said access directive;

performing said access directive upon said access controlled door lock; and sending said security state.

7. The access control module of claim 6, wherein said security state is selected from the group consisting of a secure door, a forced open door, a held open door, and an unlocked door.

8. The access control module of claim 1, wherein said access controlled door lock is selected from the group consisting of a piezoelectric controlled door lock, a solenoid controlled door lock, and a Direct Current (DC) motor.

9. The access control module of claim 1, wherein said processing computer is selected from the group consisting of a computer, a finite state machine, a neural network, and an inference engine;

10. The access control module of claim 1, wherein said communication interface comprises:

a communication interface computer accessibly coupled with a communication interface memory, interactively coupled with said merged power-communication cable; and a communications program system comprising at least one program step residing in said communication interface memory.

11. The access control module of claim 10, wherein at least one of said communication interface computer and said processing module implements a TCP/IP Stack.

12. A method for controlling an access controlled door lock, the method comprising:

providing a first electrical power from a merged power-communication cable to an access control identification mechanism of a door;

providing a second electrical power from said merged power-communication cable to an access controlled door lock positioned on the door; and distributing part of the electrical power from the merged power-communication cable to a processing module positioned in said door; and operating said processing module to interact with said access control identification mechanism and with said merged power-communication cable to control said access controlled door lock.

13. The method of claim 12, wherein said merged power-communication cable implements a form of Power Over Ethernet (PoE) protocol.

14. The method of claim 12, wherein operating the processing module to interact with said access control identification mechanism and with said merged power-communication cable to control the access controlled door lock further comprises:

controlling said access controlled door lock based upon an access directive incorporating an access identification from said access control identification mechanism.

15. The method of claim 14, wherein said access control identification mechanism comprises an access control card reader.

16. The method of claim 14, wherein operating said processing module to interact with said access control identification mechanism and with said merged power-communication cable to control said access controlled door lock further comprises, receiving a sensed door position from a door position sensor at said processing module;

receiving a sensed request-to-exit state from a Request Exit (REX) switch at said processing module; and controlling said access controlled door lock based upon said sensed door position, said sensed request-to-exit state, and said access directive.

17. The method of claim 16, wherein operating the processing module to interact with said access control identification mechanism and with said merged power-communication cable to control said access controlled door lock further comprises:

determining a security state for said door based upon said sensed door position, said sensed request-to-exit state, and said access directive;

performing said access directive upon said access controlled door lock; and sending said security state.

18. The method of claim 17, wherein said security state is selected from the group consisting of a secure door, a forced open door, a held open door, and an unlocked door.

19. The method of claim 12, wherein said access control identification mechanism is positioned on an exterior of said door.

20. The method of claim 12, wherein said access controlled door lock is selected from the group, consisting of a piezo-electric controlled door lock, a solenoid controlled door lock, and a Direct Current (DC) motor.

21. The method of claim 12, wherein said access control identification mechanism is positioned in an interior of said door.

22. A system for controlling access through a door, the system comprising:

an access controlled door lock;

an access control identification mechanism;

a processing module coupled to said access controlled door lock and to said access control identification mechanism; and a power interface coupled to said processing module, said power interface for receiving electrical power from a merged power-communication cable and for managing said electrical power from said merged power-communication cable to said processing module, to provide a first electrical power from the merged power-communication cable to said access control identification mechanism, and to provide a second electrical power from the merged power-communication cable to said access controlled door lock, wherein said processing module interacts with said access control identification mechanism and with said merged power-communication cable to control said access controlled door lock.

23. The system of claim 22, wherein said merged power-communication cable implements a form of Power Over Ethernet (PoE) protocol.

24. The system of claim 22, further comprising:

a processing memory coupled to said processing module and to said access control mechanism, said processing memory to store an access identification received from said access control identification mechanism, said processing memory to incorporate said access identification to create an access directive and said processing module to control said access controlled door lock based upon said access directive.

25. The system of claim 24, wherein said access control identification mechanism comprises an access control card reader, and wherein said access control card reader generates said access identification stored in said processing memory.

26. The system of claim 24, further comprising:

a door position sensor coupled to said processing module, said door position sensor to provide a sensed door position to said processing module; and a Request Exit (REX) switch coupled to said processing module, said Request Exit (REX) switch to provide a sensed request-to-exist state to said processing module, wherein said processing module controls said access controlled door lock based upon said sensed door position, said sensed request-to-exit state, and said access directive.

27. The system of claim 26, wherein said processing module determines a security state for said door based upon said sensed door position, said sensed request-to-exit state, and said access directive, wherein said processing module performs said access directive upon said access controlled door lock, and wherein said processing module sends said security state.

28. The system of claim 27, wherein said security state is selected from the group consisting of a secure door, a forced open door, a held open door, and an unlocked door.

29. The system of claim 22, wherein said access controlled door lock is selected from the group consisting of a piezoelectric controlled door lock, a solenoid controlled door lock, and a Direct Current (DC) motor.

30. The system of claim 22, wherein said processing module, further comprises, a processing computer and a processing memory coupled to said processing computer, said processing memory containing at least one program step of a processing program system directing said processing computer.

31. An access control module for controlling access through a door, the access control module:

a power interface coupled to a merged power-communication cable and controllably coupled to a processing computer in a processing module;

said power interface providing electrical power to an access control identification mechanism;

said power interface providing electrical power to an access controlled door lock;

said power interface providing electrical power to a communication interface; and wherein said communication interface comprises:

a communication interface computer;

a communication interface memory coupled to said communication interface computer and coupled to said merged power-communication cable through said power interface; and a communications program system comprising at least one program step residing in said communication interface memory;

wherein said processing module comprises:

said processing computer accessibly coupled with a processing memory containing at least one program step of a processing program system directing said processing computer;

said processing computer communicatively coupled with said communication interface coupled with said merged power-communication cable;

said processing computer coupled with a peripheral interface coupled with said access control identification mechanism, with said merged power-communication cable, with a door position sensor, with a request-to-exist switch, and with said access controlled door lock;

wherein said processing program system comprises the program steps of:

managing said power interface to distribute said electrical power; and controlling said access controlled door lock based upon interactions with said access control identification mechanism, with said door position sensor, with said request-to-exit switch, and with said merged power-communication cable.

32. The access control module of claim 31, wherein said merged power-communication cable implements a form of Power Over Ethernet (PoE) protocol.

33. An access control module for controlling access through a door, the access control module comprising:

a power interface to be coupled with a merged power-communication cable;

a communication interface to be coupled with said merged power-communication cable;

an access control identification mechanism coupled to said power interface and coupled to said communication interface;

an access controlled door lock coupled to said power interface and coupled to said communication interface;

a processing module coupled to said power interface, coupled to said communication interface, coupled to said access control identification mechanism and coupled to said access controlled door lock, said processing module comprising a processing program system, said processing program system comprising the step of directing said processing module to distribute part of said electrical power from said merged power-communication cable to said processing module, providing a first electrical power to said access control identification mechanism and providing a second electrical power to said access controlled door lock;

a request-to-exit switch coupled to said processing module; and a door position sensor coupled to said processing module.

34. The access control module of claim 33, wherein said processing program system further comprises the step of controlling said access controlled door lock based upon interactions with said access control identification mechanism, with said door position sensor, with said request-to-exit switch and with said merged power communication cable.

35. The access control module of claim 33, wherein said merged power-communication cable implements a form of Power Over Ethernet (PoE) protocol.

36. An access control module for controlling access through a door, the access control module comprising:

a power interface to be coupled with a merged power-communication cable;

a communication interface to be coupled with said merged power-communication cable, the communication interface comprising:

a communication interface computer;

a communication interface memory coupled to said communication interface computer and coupled to said merged power-communication cable through said power interface; and a communication program system comprising at least one program step residing in said communication interface memory;

an access control identification mechanism coupled to said power interface and coupled to said communication interface;

an access controlled door lock coupled to said power interface and coupled to said communication interface;

a processing module coupled to said power interface, coupled to said communication interface, coupled to said access control identification mechanism and coupled to said access controlled door lock;

a request-to-exit switch coupled to said processing module; and a door position sensor coupled to said processing module.

37. The access control module of claim 36, wherein said merged power-communication cable implements a form of Power Over Ethernet (PoE) protocol.

38. The access control module of claim 36, wherein said processing module comprises a processing program system comprising the program step of controlling said access controlled door lock based upon interactions with said access control identification mechanism, with said door position sensor, with said request-to-exist switch and with said merged power-communication cable.

* * * * *